(12) United States Patent
Brueckheimer et al.

(10) Patent No.: US 6,574,224 B1
(45) Date of Patent: Jun. 3, 2003

(54) PROCESSING COMMUNICATION TRAFFIC

(75) Inventors: Simon Daniel Brueckheimer, London (GB); David John Stacey, Hertfordshire (GB); Eric Fai Tsang, Chelmsford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/346,322

(22) Filed: Jul. 2, 1999

(51) Int. Cl.[7] .......................... H04L 12/28; H04T 12/56; H04J 3/16
(52) U.S. Cl. .................... 370/395.6; 370/466
(58) Field of Search ................... 370/389, 395.1, 370/395.5, 395.52, 395.6, 395.61, 395.63, 395.64, 395.65, 412, 413, 415, 417, 431, 458, 466, 469

(56) References Cited

U.S. PATENT DOCUMENTS

| | | | | |
|---|---|---|---|---|
| 5,701,300 A | * | 12/1997 | Jeon et al. | 370/392 |
| 6,046,999 A | * | 4/2000 | Miki et al. | 370/395.52 |
| 6,052,371 A | * | 4/2000 | Lemieux | 370/328 |
| 6,266,343 B1 | * | 7/2001 | Caves | 370/395.61 |
| 6,400,720 B1 | * | 6/2002 | Ovadia et al. | 370/395.2 |
| 6,411,629 B1 | * | 6/2002 | Bentall et al. | 370/392 |
| 6,424,651 B1 | * | 7/2002 | Chan et al. | 370/395.6 |
| 6,449,276 B1 | * | 9/2002 | Subbiah et al. | 370/395.1 |

* cited by examiner

*Primary Examiner*—David Vincent
(74) *Attorney, Agent, or Firm*—Lee, Mann, Smith, McWilliams, Sweeney & Ohlson

(57) ABSTRACT

An arrangement for interfacing between TDM and ATM networks consists of a family of devices that comprises two groups. The first group comprises devices that perform multiplexing, segregation and routing field translation for the respective traffic type. They may also remove or substitute an outermost layer of encapsulation. These first group devices are bi-directional and output buffered with respect to the network. The second device group comprises devices that perform format conversions between the service payload (voice, video or data) and an adaptation layer control format. These second group devices are also bi-directional and buffering depends on the particular function, e.g. real-time, segmentation.

10 Claims, 21 Drawing Sheets

*Genetic Adaptation Technology Architecture*

*Generic Adaptation Technology Architecture*

ATM Core System Partitioning

*TDM access, DSP & Adaption Resource Module*

*AAL-2 Switching Resource Module*

*MPLS/L2TP Switching Resource Module*

*ATM, DSP & AAL Interworking Resource Module*

*VoIP - ATM AAL Interworking Resource Module*

*VoIP - ATM Trunking Resource Module*

*Generic Adaptation Technology - Large Scale*

Generic Switch Resource Module Family

*TDM traffic, DSP & ATM Adaptation Resource Module*

*ATM/AAL-2 Interface Resource Module*

*DSP & AAL/IP Interworking Resource Module*

Label Device Architecture (Ingress)

PROCESSING COMMUNICATION TRAFFIC

This invention relates to arrangements and methods for processing communications traffic, and in particular to integrated circuit constructions for performing such processing.

BACKGROUND OF THE INVENTION

Traditionally, two types of legacy telecommunication networks have been developed. The first type is connection oriented and is used for the transport of narrow band voice traffic, typically carried in TDM frames. Such networks comprise for example synchronous or plesiochronous networks. The second type of legacy network is connectionless in nature and is used for the transport of broad band packet or cell-based data traffic. There is currently a drive towards unified networks which provide end to end transport for both voice and data services. However, as there is a well established voice network base, network operators are naturally reluctant to replace such legacy networks. This issue has been addressed by providing broad band (asynchronous) overlay networks which interface with the established TDM networks to provide a voice and data transport function. At the interface between the two networks, an interface function maps TDM frames into packets or ATM cells and vice-versa. ATM is of course just one example of a packet based network.

A goal of development of telecommunications networks is to realise the potential integration of real-time and non-real-time services. The key examples of these two types are voice telephony (real-time) and computer data (non-real-time). Voice telephony is served predominantly by circuit switched connection orientated networks that are arranged to deliver a guaranteed quality of service. Such networks are implemented by transport and switching systems that use a time division multiplex of circuits. Computerdata is served predominantly by the Internet which uses a packet forwarding connectionless mode of operation or Internet protocol (IP), that is a workable paradigm best suited to the burstiness of traffic demand and general non-deterministic nature of this traffic type.

The network supplier industry, predominantly comprising PTTs, is poised to decide the technologies and protocols that will serve the integration of these two different types of service. The two main contenders for universal transport and switching are ATM (asynchronous transfer mode) and IP (Internet protocol), although there are many other legacy systems and nascent technologies that may offer specialised solutions to carrying key services.

ATM (asynchronous transfer mode) has been designed from the outset to adapt to many different types of communications traffic. ATM is a connection orientated network mechanism, allowing dynamic bandwidth configuration and flexibility as a key advantage over circuit switched networks. ATM has adaptation layers for carrying given services over ATM transport and switches. However, the fixed length of ATM cells, while suitable to segmentation of long data packets, thereby simplifying and streamlining switching technologies, is still too large for certain compressed voice services, that suffer a cell assembly or 'cellification' delay affecting existing network delay budgets and acceptable voice characteristics.

This issue has been addressed by the definition of Adaptation Layer 2, that is distinct from other ATM adaptation layers, since it de-couples voice packets from ATM cell boundaries, and since mini-packets from several calls can be multiplexed into a single ATM connection. This multiplex is asynchronous to the cell boundary. The multiplex effectively introduces a new switching layer above the ATM layer.

IP was designed for computer communications, although it has been recently demonstrated to be suitable for real-time services if congestion can be controlled to an extent that permits an acceptable quality of service to be achieved. Much activity surrounds investigations and implementation of mechanisms for limiting the degree of congestion and controlling quality of service in IP networks:

The real-time Protocol (RTP) was devised to carry real-time traffic, in particular voice and video, services the existing transport protocols (TCP and UDP) can not cater for. RTP takes into account the lossy behaviour of IP networks when congested, in a manner suitable to real-time services. UDP has no necessary timing or sequence information; TCP does not account for the low-delay and immediacy of real-time service requirements—a late packet should be dropped rather than retransmitted.

Congestion and packet loss can be limited by reserving bandwidth on key routes in an IP network, as implemented in the Reservation Protocol (RSVP). This mechanism in effect makes the connectionless network behave as if connection orientated, since all packets entitled to use the reserved bandwidth must follow an established route.

Other protocols and routing policies have gone further to implement a fully connection orientated paradigm, by establishing routes for traffic in several if not all switching nodes in an IP network. Multiprotocol Label Switching (MPLS) establishes routes for connections in the routing tables of IP nodes, supporting point-to-point and point-to-multi-point connections. Packets bearing a label may be forwarded directly on the pre-configured route, achieving low-latency, and having the benefit of reservation of switching resources and transmission bandwidth. Layer 2 Tunnelling Protocol (L2TP) defines tunnels that behave in a similar manner to labelled routes in MPLS, but offers a further multiplex layer of calls within tunnels.

These IP mechanisms are analogous to ATM QoS and VP and VC partitioning. The particular issue of IP packetisation delay affecting delay sensitive services, has not however been addressed for two reasons:

IP packets may be variable length, and therefore the packetisation delay is arbitrary. Due to present day anomalous pricing of IP service against higher cost PTT telephony, there is no user financial drawback due to the poor bandwidth efficiency of IP header to payload ratio;

IP networks carrying voice have not yet achieved an acceptable QoS in practice, and the packetisation delay is not yet a significant artefact. In time, the delay and efficiency might become issues that detract from the advantages of IP.

Beyond the ability to switch in these adaptation layers and to interwork between them, is the requirement to trunk to legacy TDM and packet based networks. The various demands of IP and ATM adaptation layers, and the likelihood that both IP and ATM technologies will be deployed in the near term for both real-time and non-real-time services, has demonstrated a need for the integration of these technologies.

SUMMARY OF THE INVENTION

An object of the invention is to minimise or to overcome the above disadvantage.

According to a first aspect of the invention there is provided a generic adaptation architecture in which functional partitioning of devices and an architecture that is optimal for variable and fixed packet adaptation layers so as to enable trunking, interworking and switching of the adaptation layers.

The technique provides a functional partitioning of devices and an architecture that is optimal for variable and fixed packet adaptation layers having the greatest possible degree of flexibility in isolation or in combination to serve trunking, interworking and switching of the adaptation layers. The functional partitioning and architecture forms an optimal integration and interworking of AAL based and IP based traffic, and is optimal for a high degree of scalability.

In a further aspect, the invention provides a functional partitioning and architecture that caters for recursive encapsulation of adaptation layers.

In another aspect, the invention provides a functional partitioning and architecture that serves encapsulations of IP in ATM AAL-2 and AAL-5.

The functional partitioning may utilise a fixed length packet switch to switch all traffic in a generic manner, and an input/output buffer paradigm to enable unlimited scaling and interworking.

As the architecture is generic, it is fully extensible to a wide range of more specialised functions and may be added to for specific new adaptation layers.

In yet another aspect, the invention provides a functional partitioning of devices that is an optimal separation of concerns for traffic management, Quality of Service (QoS) controls, buffer depth scaling and low latency.

BRIEF DESCRIPTION OF THE DRAWINGS

An embodiment of the invention will now be described with reference to the accompanying drawings in which.

DESCRIPTION OF PREFERRED EMBODIMENT

Figure 1:
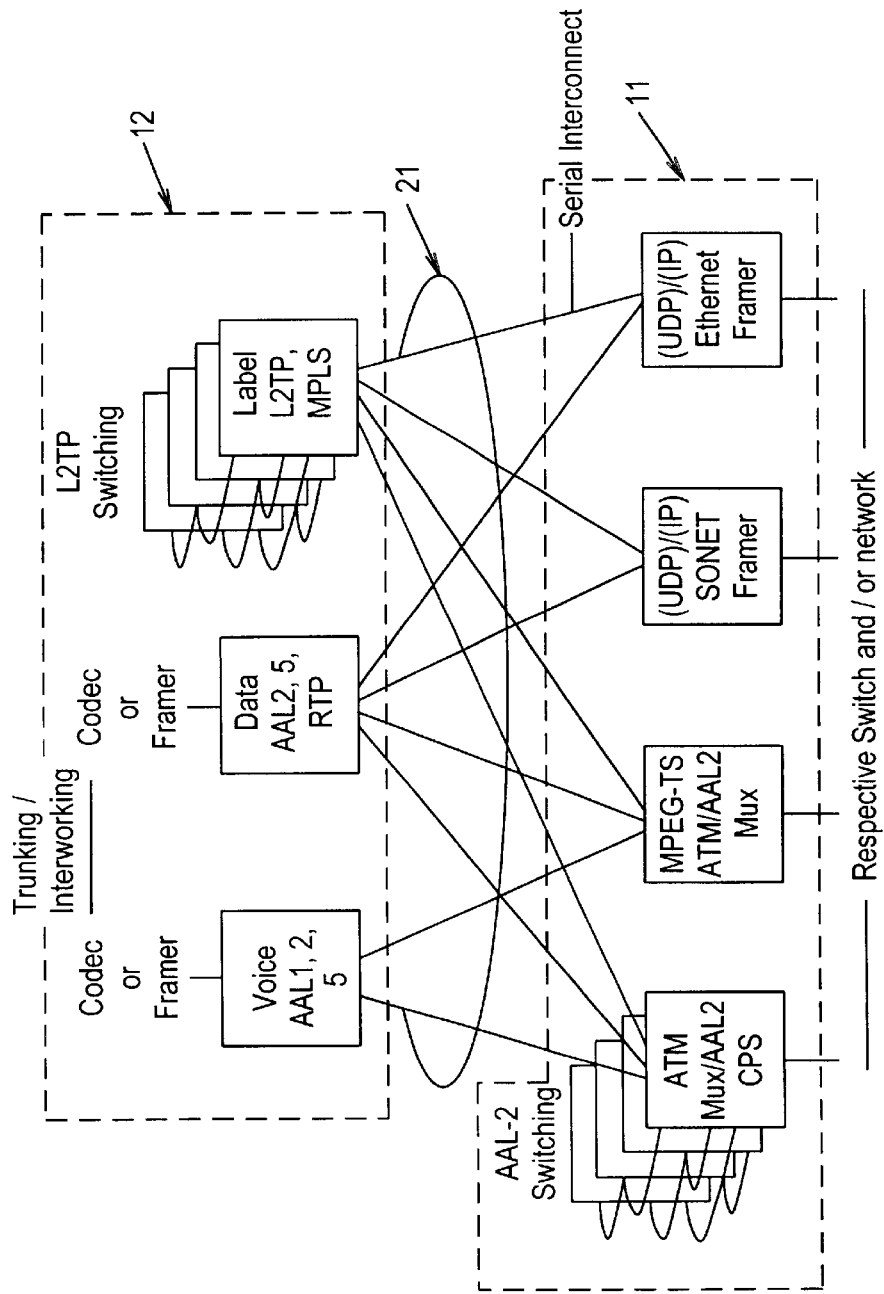
FIG. 1 illustrates the architecture of the generic adaptation technology partitioning.

Regarding first to FIG. 1, the figure shows in schematic form an ATM interface arrangement consisting of a family of devices that comprises two groups. The first group 11 comprises devices that perform multiplexing, segregation and routing field translation for the respective traffic type. They may also remove or substitute an outermost layer of encapsulation. These devices are bidirectional and ideally output buffered with respect to the network indicated in the figure. The second group 12 comprises devices that perform format conversions between the service payload (voice, video or data) and an adaptation layer control format. These devices are also bidirectional and buffering depends on the particular function, e.g. real-time, segmentation.

The interface 21 between devices of the two groups, and devices within a group, is advantageously a generic interface for the transference of arbitrary and variable length packets. This interface provides the means to interconnect devices of any type quite freely, either by mutual interconnection or self interconnection. One or more instances of a single device may connected to perform a switching function, or routing and removal of nested encapsulation of given adaptation layer. Such an arrangement may be scaled by bandwidth or number of connections, limited only by the addressing capabilities of its tables and the number of serial links over which it may multiplex or segregate traffic. Instances of different devices of the same or of different groups may be connected to switch, trunk, inter-work, and route and remove nested encapsulation of one or more adaptation layers.

The common interface format provides a high degree of flexibility and an opportunity to extend the type of devices in this architecture. The buffer apportionment for a given device will depend on its purpose and the service type, but will take account of the services with which it may be multiplexed and the devices with which it may be configured.

Advantageously, the arrangement of FIG. 1 is provided in the form of an integrated circuit chip suite.

FIG. 1 shows by way of example instances of devices suitable for ATM and IP adaptation layers. However, it will be understood that the architecture is not limited the devices shown, or to just ATM and IP. The first group 11 of multiplexing devices includes the ATM/AAL2 mux 21, the MPEG-TS mux 22, the IP over SDH framer/router 23, and IP over Ethernet devices 24. All these devices perform a multiplexing/segregating function based on a connection/tunnel identifier, label or destination address, and use the generic interface to produce arbitrary but fixed length packets, up to a maximum but short length. Long IP packets for example are segmented when carried on the interconnect, with a indication of the last segment of the packet. ATM cells are sufficiently short for them not to require segmentation. Segments may be stored and reassembled or directly switched on receipt.

For example, the ATM/ML-2 Mux device can:
remove or add the ATM header, and if ML-2, the AAL-2 CPS header;
segregate or multiplex at the ATM level or additionally the AAL-2 level.
route on the VPI and VCI of the ATM header, or additionally on the CID of the ATM header.
buffer payloads and control information before output to the network side. This arrangement is suitable for the statistical multiplexing of payloads at the ATM or additionally AAL-2 level. The multiplexing may be of payload form a single, even the same device, or several devices.

The MPEG-TS device performs similar function to the ATM/AAL-2 device, however the services may be AAL-2 in ATM in MPEG-TS, ATM in MPEG-TS or AAL-2 directly in MPEG-TS. The objective of the device would be to process the MPEG-TS header routing information and add or remove the MPEG-TS header to ATM, AAL-2, or ML-2 in ATM as appropriate. Although shown separately, those skilled in the art will appreciate that this function may be integrated with the ATM/AAL-2 Mux if desired.

The IP over SDH or IP over Ethernet devices perform functions appropriate to IP:
remove or add the IP header, and if appropriate the UDP or TCP headers;
segregate or multiplex IP packets at the IP level, the transport layer (UDP/TCP) or the packet payload for nested protocols as appropriate;
route on the IP destination address, the UDP or TCP port identifiers or by default if transporting nested L2TP. The IP layer may be optional if the SDH/Ethernet is transporting PPP, L2TP or MPLS directly, in which case the routing may be optional or by default for further processing in the label device;
segment long packets for the generic interface short packet requirement, and reassemble on receipt of segments. An output buffer to the network may be implemented for segment reordering if necessary and not performed elsewhere, or for priority multiplexing or routing table lookup delay.

The label device can be designed to perform functions appropriate to L2TP, PPP, PPTP and MPLS, for example:
remove or add a L2TP, PPP, PPTP or MPLS header;
segregate or multiplex packets by routing derived from the tunnel identifier and call identifier of L2TP and PPTP, connection identifier of PPP, or label of MPLS;
buffer segments to concatenate segments received on the generic interface to prevent packet interleaving if necessary, or for differentiating connection priorities.
remove or add AAL-5 trailers and padding if communicating with the ATM/ML-2 device.

Those skilled in the art will appreciate that the three devices just described can intercommunicate to create interworking between payloads carried in the adaptation layers just described, most significantly between ATM adaptation layers and IP. The devices can also interwork by for example encapsulating L2TP in ML-5 in ATM, or IP in AAL-5 in ATM in MPEG-TS. All standards compliant nested protocols are preferred and possible.

It will also be appreciated that for example the ATM/AAL-2 device may be self connected as one or more instances of the device, limited only by the number of generic serial interfaces, to perform a switching function for AAL-2. The device implements buffering on output, thus following an output buffer switch paradigm, in which each output buffer may be apportioned dynamically across all the connections of one device for example, a common memory buffer paradigm.

In an similar manner, the label device may be cascaded to perform label or tunnel and call switching. The same device may be connected in several layers to add or remove, and perform switching at several nested layers of labels or tunnels. This is suitable for MPLS and L2TP that may have several levels of encapsulation.

The second group of format conversion and service interface devices comprises the voice and data devices. The voice device 25 performs conversion between for example ITU-T G.series codecs and AAs 1, 2 and 5, processing all the controlling fields of these adaptation layers. The payloads transferred on the generic interface are derived from the payloads of ATM cells and/or AAL-2 packets and termed structured data units (SDUs). The voice device adds or removes the control fields of the SDUs and interfaces to the codec service or respective network interface. This application is termed trunking. The codec service may be looped back through the voice device. This facility enables interworking between ATM adaptation layers. The voice device also buffers packets on its input side with respect to the network, so that for these real-time services it can absorb the timing jitter induced by ATM networks. On the output side, the device need not use buffering; the ATM/AAL-2 Mux device for example may use its output buffering to store packets for statistical multiplexing.

The data device 26 performs conversion between data packets for example IP, Frame Relay and AAL-2 frame mode data (I.366.1 SSTED), ML-5 frame SAR (I.363.5), as well as the ML-2 CAS, DTMF and Fax demodulation out-of-band (OOB) mechanisms (I.366.2), processing all the controlling fields of these adaptation layers. In addition it may perform conversion between ITU-T G.series codecs and the IETF real-time Protocol (RTP—RFC 1889, H.225.0). It may also perform conversion or create AAL-2 OAM flows and AAL-2 connection control. The data device may perform concatenation of payloads, and segmentation of packets for the generic interconnect. Consequently it may use buffering on its input and output side with respect to the network. Furthermore, flow control may be avoided by traffic shaping to ensure that a bursty data source conforms to a real-time, fixed bandwidth behaviour, such that it may be multiplexed by the ATM/ML2 Mux with traffic from the voice device. The Data and the Voice devices may communicate via the service interface and optional signal processors to perform RTP to ATM ML interworking.

The combination of the voice and ATM/AAL-" Mux devices provides full ITU-T and ATM Forum standards compliance for ML 1, 2 and 5 voice services, with the capability to perform trunking to/from packet and TDM transmission, and interworking between AALs. The ATM/ML-2 Mux ASIC may be deployed independently to support the AAL-2 relay switching function.

Figure 2:
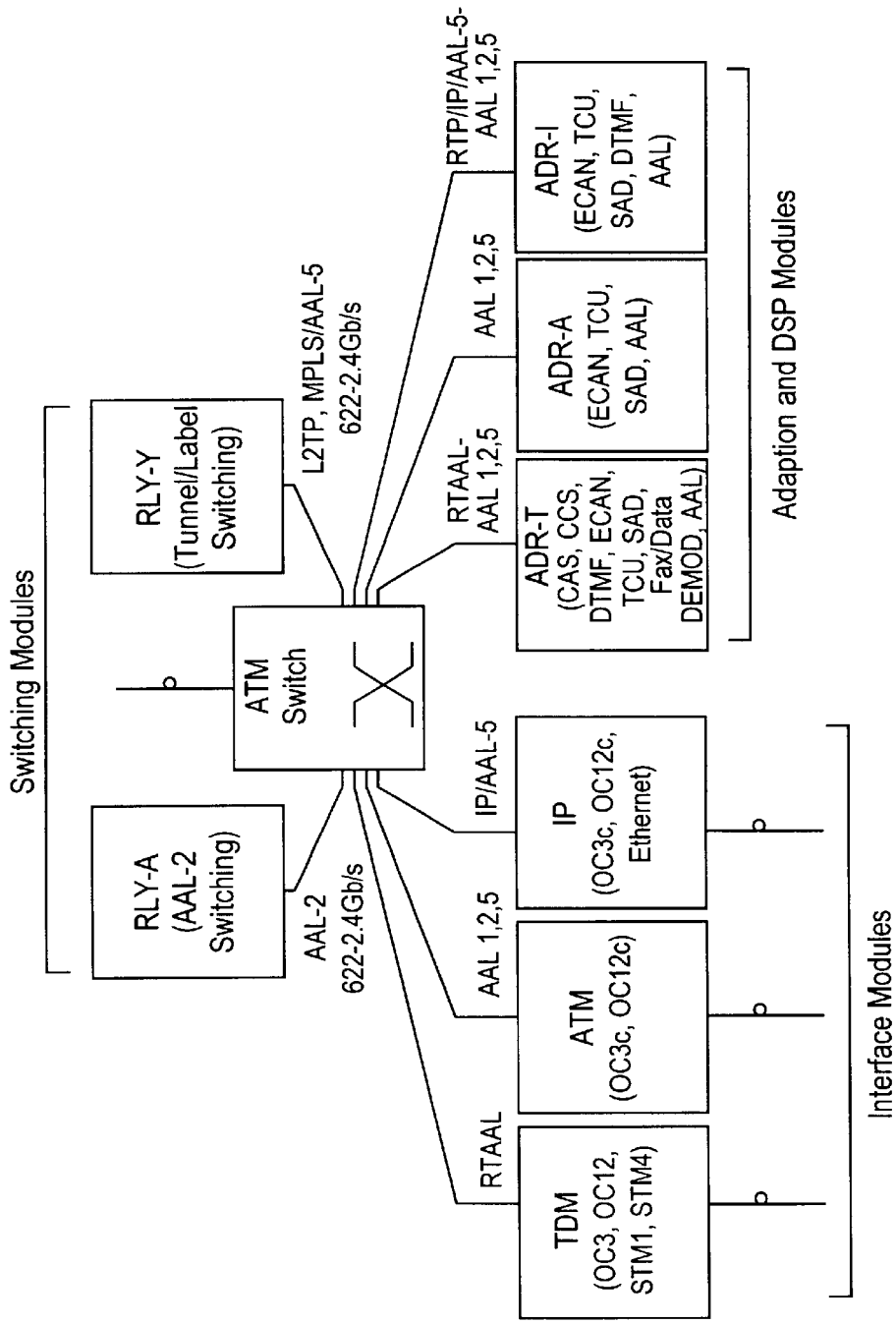
FIG. 2 shows a system architecture partitioning based on an ATM core switch.

Referring now to FIG. 2, this shows a family of hardware resource modules that can use a point-to-point ATM backplane interconnect, to build flexible communications systems, and as an example of the flexibility of the adaptation layer device family's flexibility. There are three categories of resource module, access network interface modules 31 (trunking), DSP and adaptation resource modules 32 (trunking and interworking) and adaptation layer/tunnel switching modules 33. These modules cover some of the TDM, ATM and IP traffic applications, although those skilled in the art will appreciate that others may be designed readily. For example, a collection of resource modules may communicate via an ATM switching fabric in a pre-provisioned manner. It is feasible for this fabric to perform dynamic ATM switching functions too, for a dynamic association between resource modules and their capacity.

Figure 3:
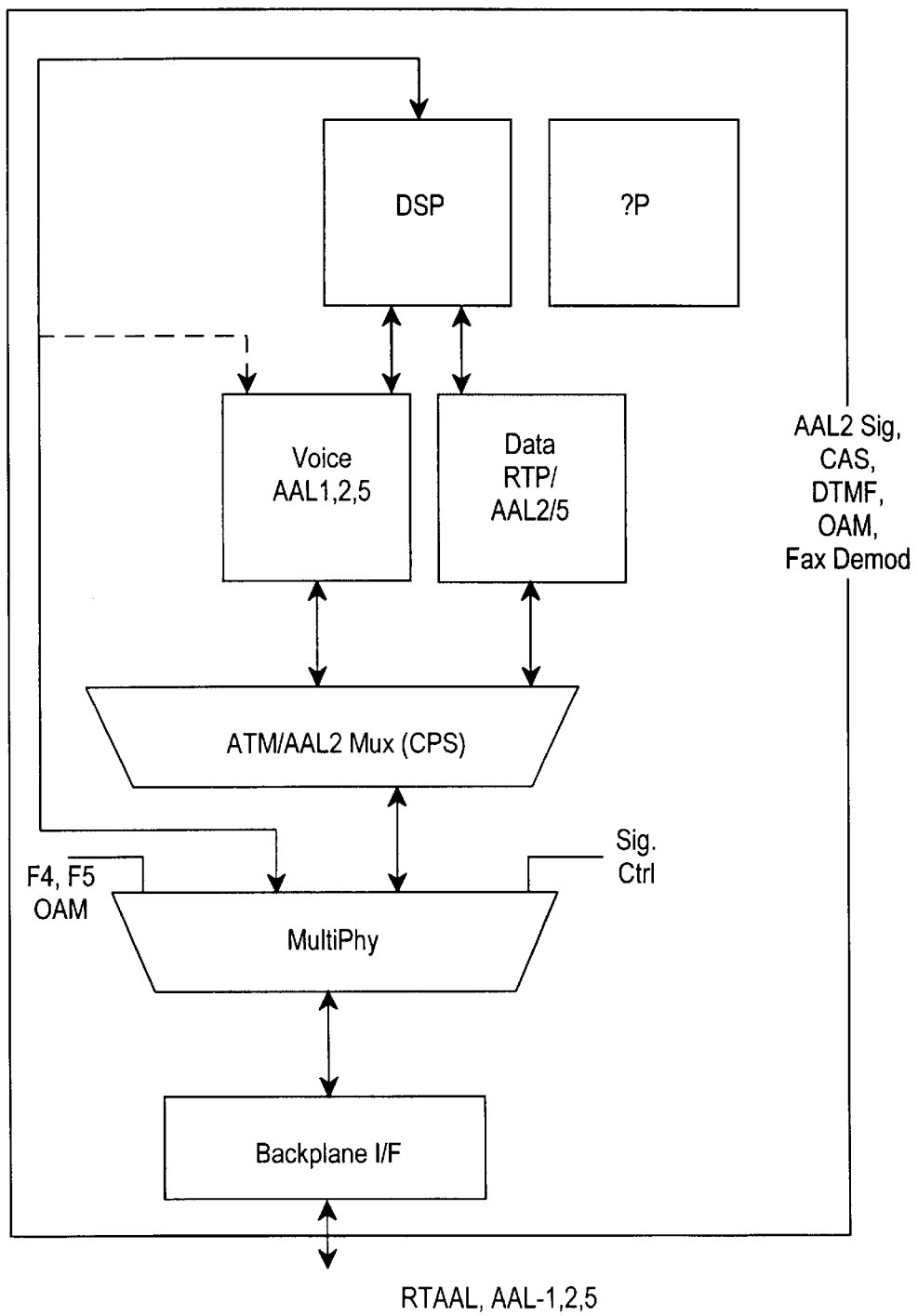
FIG. 3 shows how several of the devices of the generic adaptation technology suite may be used in the construction of an ATM switch based resource module performing signal processing functions on TDM voice and adapting the processed traffic to or from AAL1, 2, 5.

FIG. 3 illustrates a typical arrangement in which the Voice, Data and ATM/AAL-2 Mux devices are used to construct TDM access adaptation and DSP resource module. The module contains sufficient DSP devices for all the signal processing requirements of each simultaneous call. The adaptation layer devices perform the conversion on a call-by-call basis to ATM AAL-1, 2 or 5. The voice may be compressed as necessary when AAL-2 is being used, with or without silence suppression. The module may perform initial sampling of CAS, and DTMF access signalling for transparent transport by AAL-2 (I.366.2).

Figure 4:
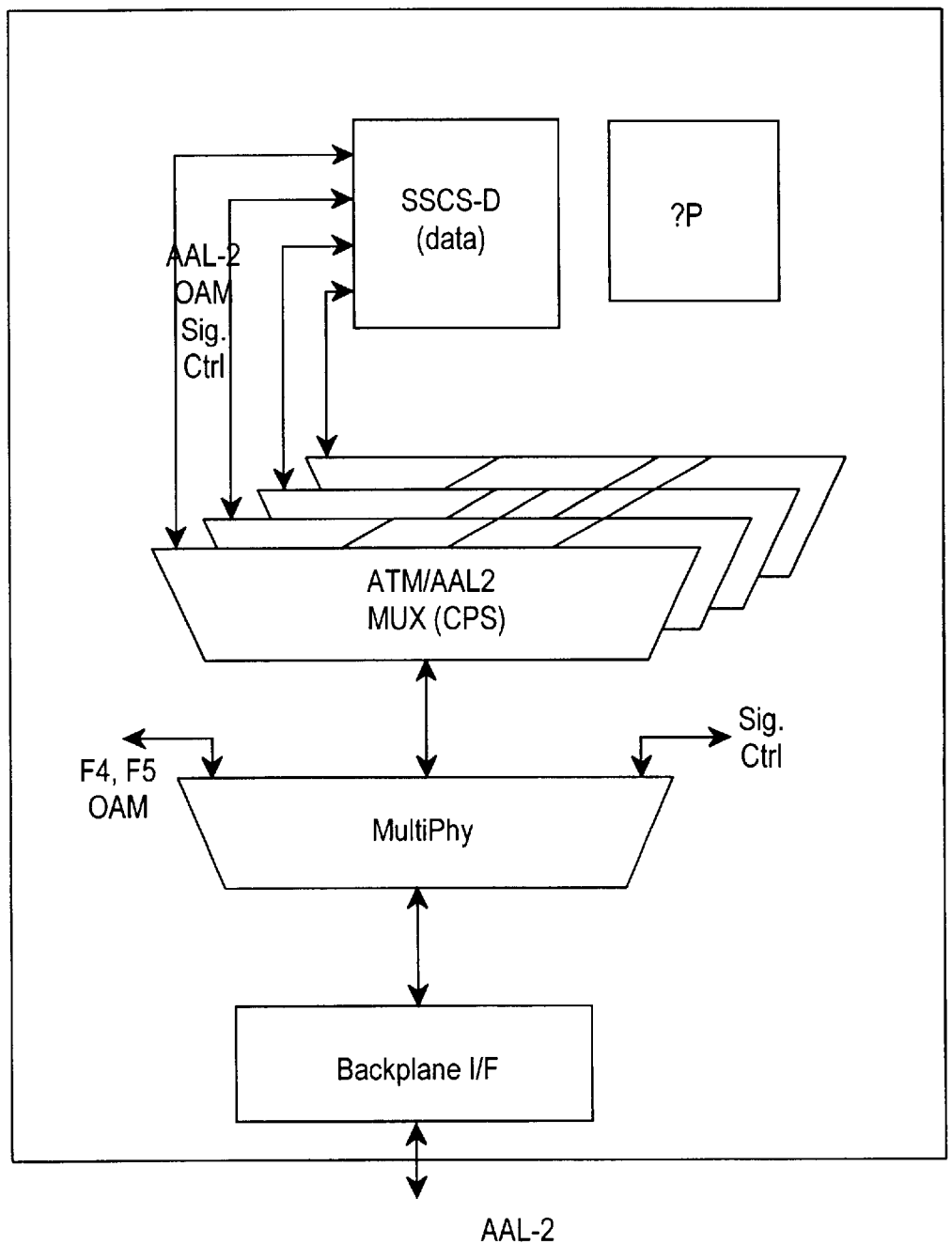
FIG. 4 shows how several of the devices of the generic adaptation technology suite may be used in the construction of an ATM switch based resource module performing AAL-2 switching.

FIG. 4 depicts an AAL-2 switching module using the ATM/AAL2 Mux device. The device is self connected to several instances, to provide greater bandwidth and/or connection capacity than one device. The Data device may process AAL-2 connection control and OAM flows in such an application. This resource module is scales to large adaptation layer switching capability by using the ATM switch core as a space switch, to provide up to half the ATM switch core's capacity.

Figure 5:
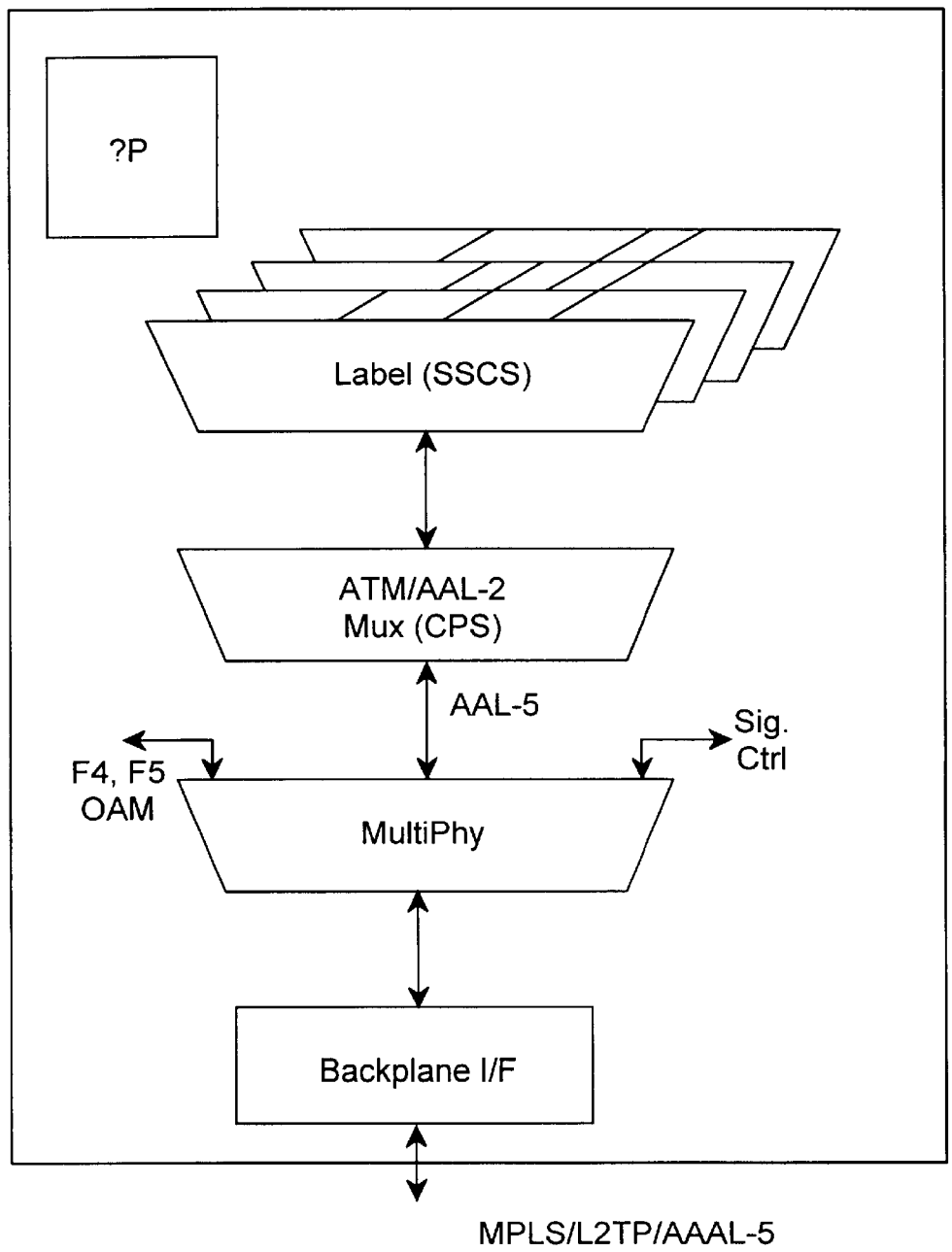
FIG. 5 shows how several of the devices of the generic adaptation technology suite may be used in the construction of an ATM switch based resource module performing MPLS label and/or L2TP switching.

FIG. 5 depicts an analogous module to the AAL-2 relay module for switching Layer 2 Tunnelling Protocol (L2TP) and Multiprotocol Label Switching (MPLS). L2TP and MPLS may be transported on SDH interfaces, IP transports and AAL-5. This module may use the ATM switch to space switch as per the AAL-2 relay module.

Figure 6:
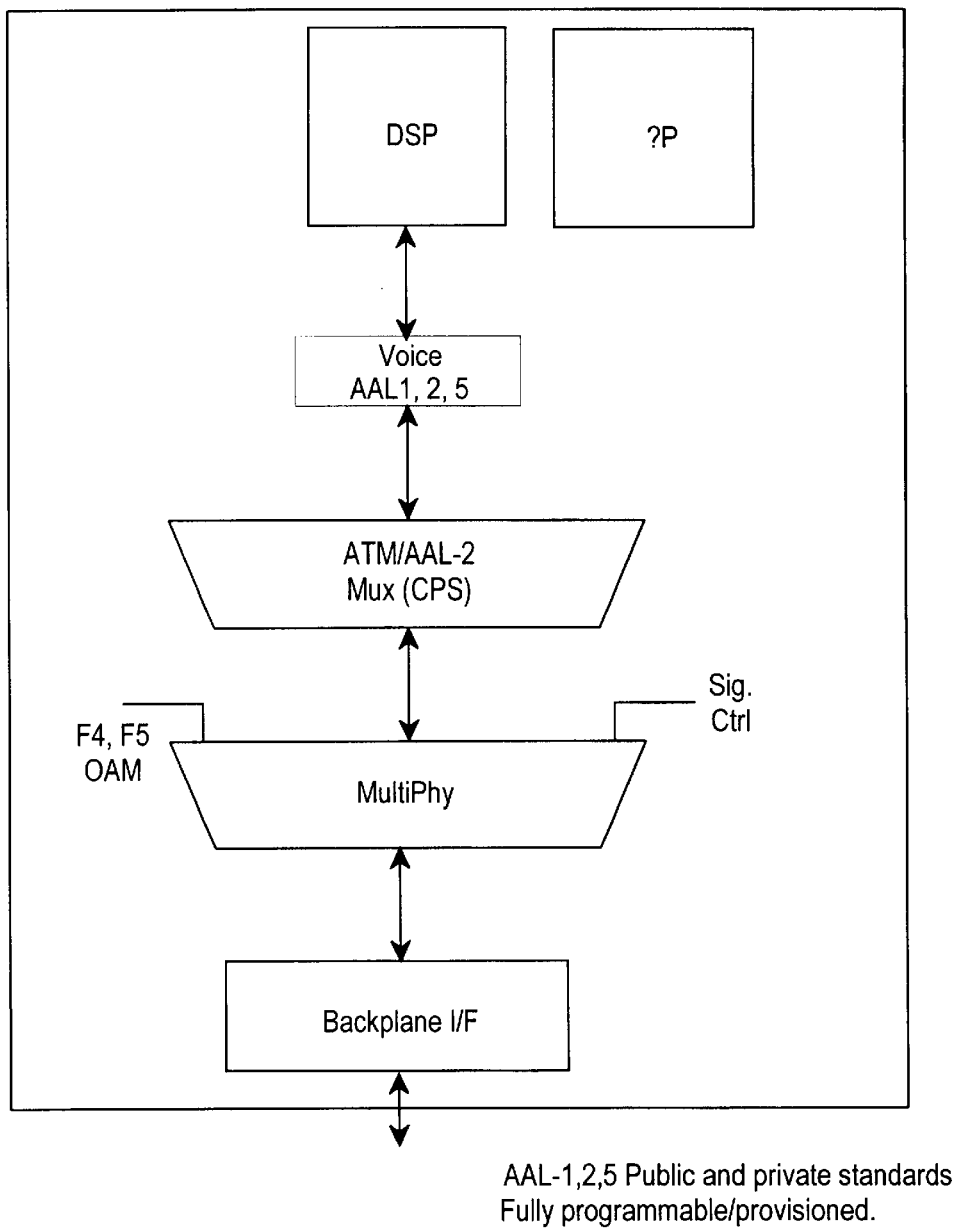
FIG. 6 shows how several of the devices of the generic adaptation technology suite may be used in the construction of an ATM switch based resource module performing signal processing functions and interworking processed traffic between AALs 1, 2, 5.

FIG. 6 depicts an ATM AAL Interworking resource module using the voice and ATM/AAL-2 Mux devices for interworking between voice services and compression algorithms and the ATM adaptation layers. AAL-1, 2 and 5 64 kb/s services may interwork directly without the need for a transcoding function, and the packet length may be varied freely to suit network delay and service. AAL-2 compressed voice may be transcoded between AAL-1, 2, and 5, 64 kb/s services, with or without silence suppression, or between other compression algorithms.

Figure 7:
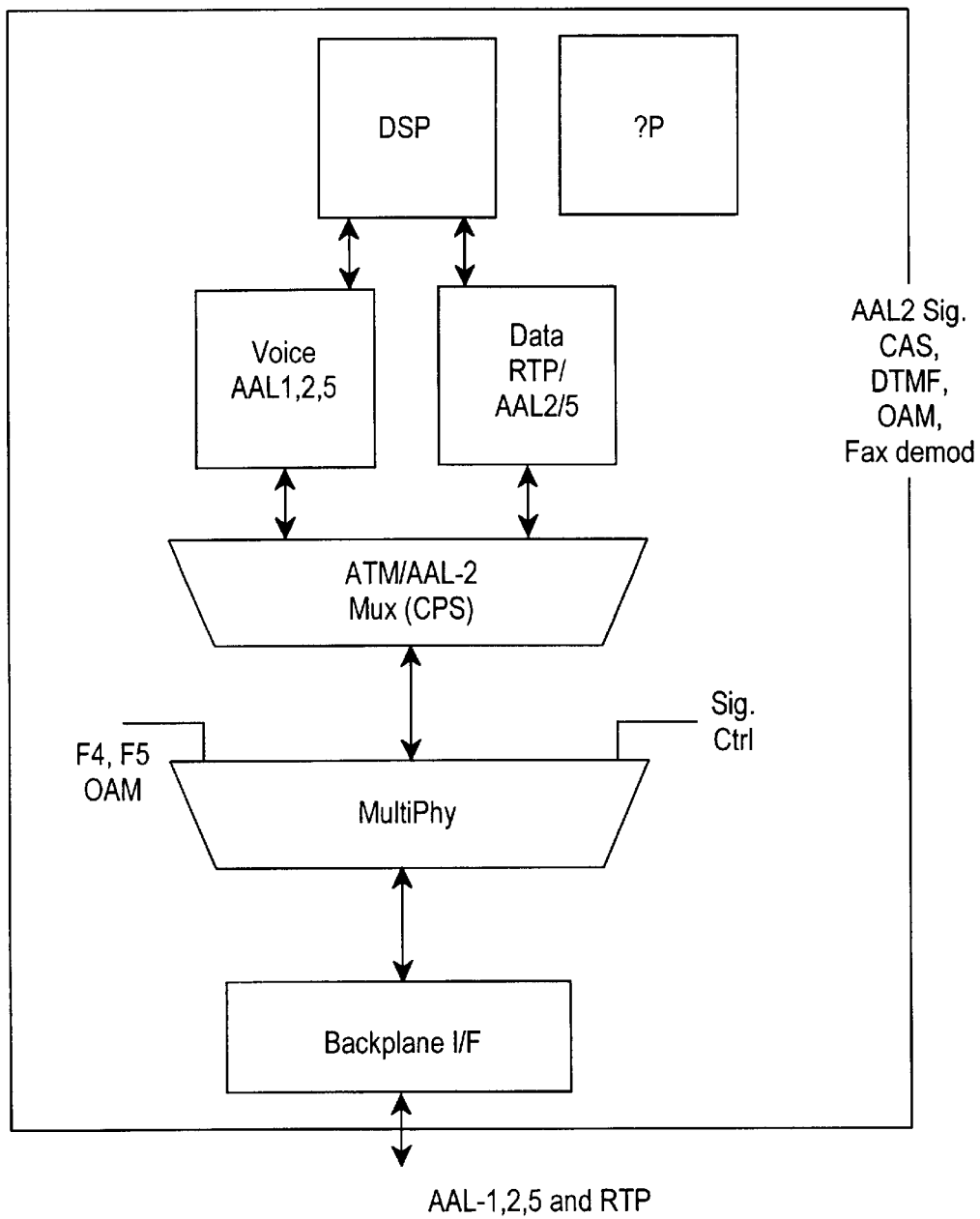
FIG. 7 shows how several of the devices of the generic adaptation technology suite may be used in the construction of an ATM switch based resource module performing signal processing functions and interworking processed traffic between RTP and AAL1, 2, 5.

FIG. 7 depicts a voice service over IP (VOIP) to ATM Interworking resource module using the Voice, Data and ATM/AAL-2 Mux devices for interworking between RTP (real time protocol) and ATM AALs. This module operates in an analogous manner to the AAL interworking resource module described above, except that voice services are carried in RTP (RFC1889) and AALs, and may require transcoding for transport over standards compliant ATM networks.

Figure 8:
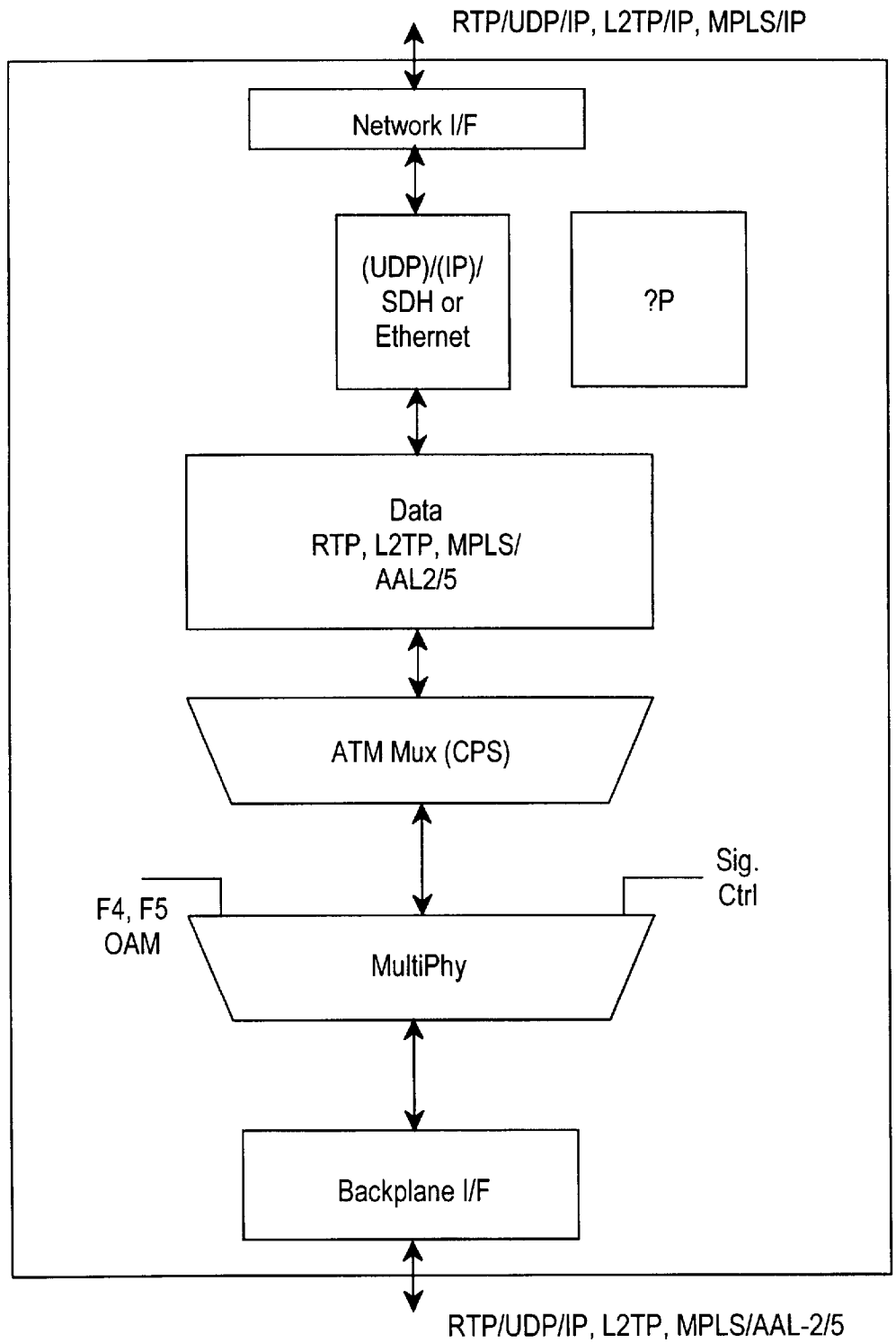
FIG. 8 shows how several of the devices of the generic adaptation technology suite may be used in the construction of an ATM switch based resource module to interface to IP traffic carried in Ethernet or the SDH.

FIG. 8 depicts a companion resource module using IP over SDH/Ethernet, Data and ATM/AAL-2 devices, for interfacing to IP transports (e.g. SONET and Fast Ethernet) access interfaces.

Figure 9:
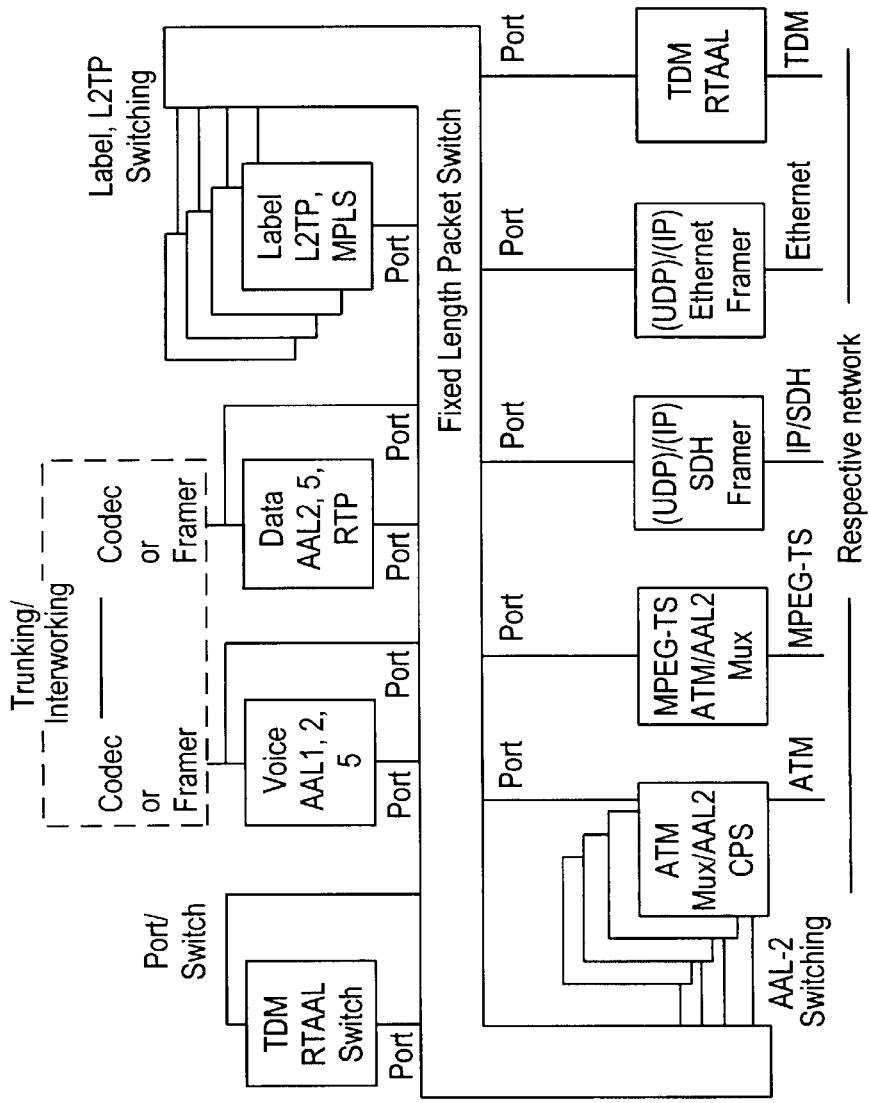
FIG. 9 shows the generic adaptation technology architecture that uses a fixed length packet switch to build large scale switches and interworking functions that process the traffic in a native generic manner.

FIG. 9 illustrates an extension of the architecture of FIG. 1 to increase the scaling range of devices. This is achieved by introducing to the architecture a fixed length packet switch (FLP) generally depicted as 91. The FLP switch performs space switching between the devices described above, by switching packets segmented and optionally padded to the limited length of the generic interface depending on desired implementation. In combination with the devices, the FLP switch may have network interfaces that take on the personality of the respective connected device. Since the FLP switch uses the generic interface for its ports 92, traffic from any device may be routed to itself or any other, to allow several layers of adaptation and encapsulation to be removed or added to packets and between networks. The scaling of the switching capability for each. respective network is now only limited by the scale of the FLP Switch.

It will be understood that the FLP Switch may be a generalisation of an ATM switch, inheriting all the speed, scaling and flexibility of an ATM switch architecture and technology implementations. It will also be appreciated that the devices described above may retain the segregation, multiplexing and routing capabilities, and format conversion capabilities. The FLP switch may exploit these capabilities for simplicity of buffering and routing, or may additionally perform buffering, multiplexing and routing. For example, the FLP switch may be input buffered. This will ensure that the artefact of AAL-2 packets straddling ATM payload, that results in more than one segment emanating from the ATM/AAL-2 Mux device, can be overcome by concatenating the segments before switching them under control of the signals of the generic interface. The FLP switch need not perform output buffering although it statistically multiplexes packets if it uses a sufficiently dilated port bandwidth, for example by using multiple of the connected output device's generic interfaces, and can rely on the output buffering in the connected receiving device. The FLP Switch can extend the addressing range of the devices described above by using input connection identifier and port to index a further routing table to derive output connection identifier and port.

The Voice and Data may be extended to use the generic interface on their service side to perform format conversions that can interwork via the FLP Switch. Furthermore, the FLP Switch may adopt a TDM network interface by using the real time ATM adaptation layer (RTAAL) that carries TDM in ATM which can be adapted to use the generic interface. This format is a Time Division Multiplex of circuits that may be switched by a TDM resource module as shown in FIGS. 9 and 10.

Figure 10:
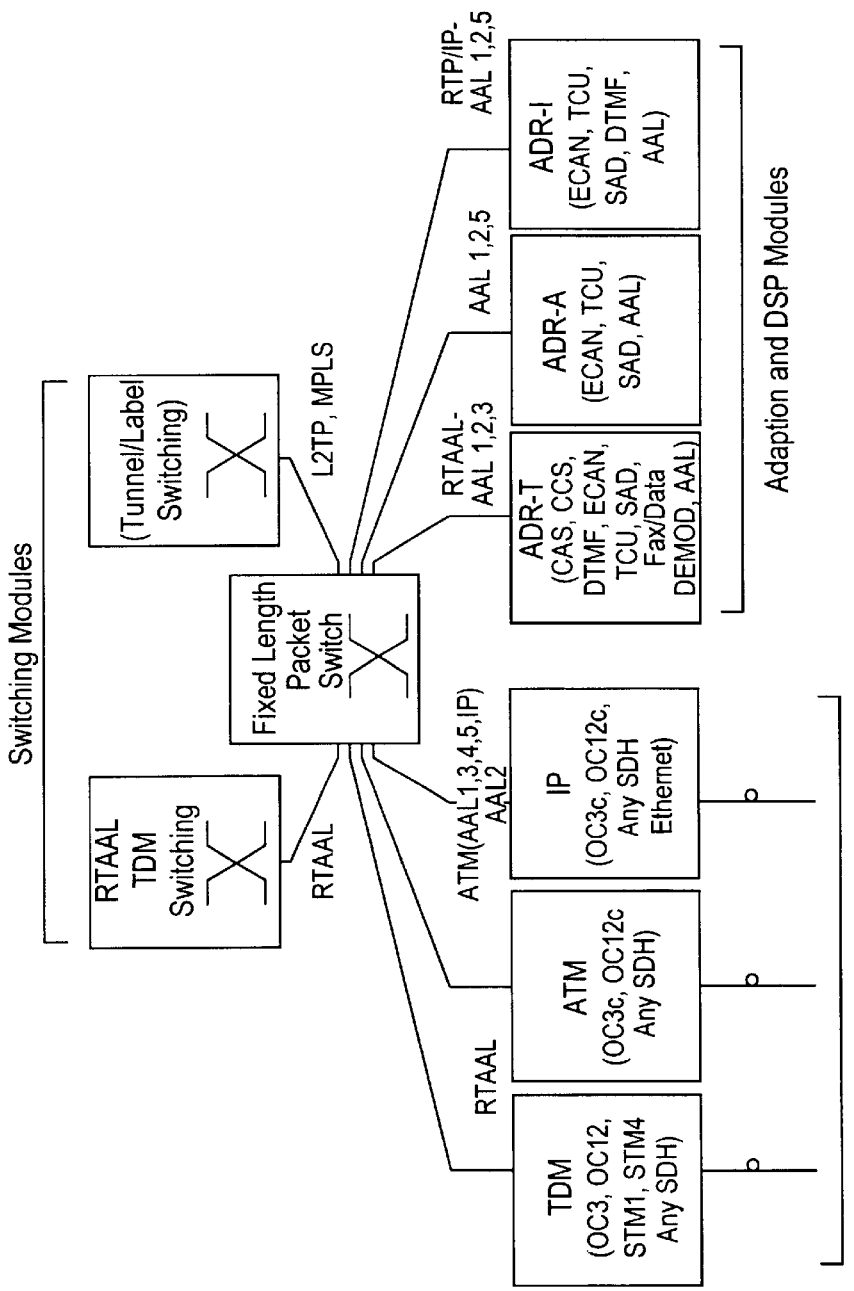
FIG. 10 shows a system architecture partitioning based on a fixed length packet switch that employs the devices of the present invention and supplementary devices in a range of functional hardware modules for network interfacing, switching and signal processing functions.

FIG. 10 depicts an example family of hardware resource modules that may use the FLP switch, in an manner analogous to the construction of FIG. 2. The advantages of this method of combining for example IP and ATM services is a lower complexity and device count solution than the ATM switch resource module family, which thus provides cost reduction. The family of hardware resource modules uses a point-to-point generic interface backplane, to build flexible communications systems. In analogy to the construction of FIG. 2, there remain three categories of resource module, access network interface modules (trunking), DSP and adaptation resource modules (trunking and interworking) and TDM/tunnel switching modules.

Figure 11:
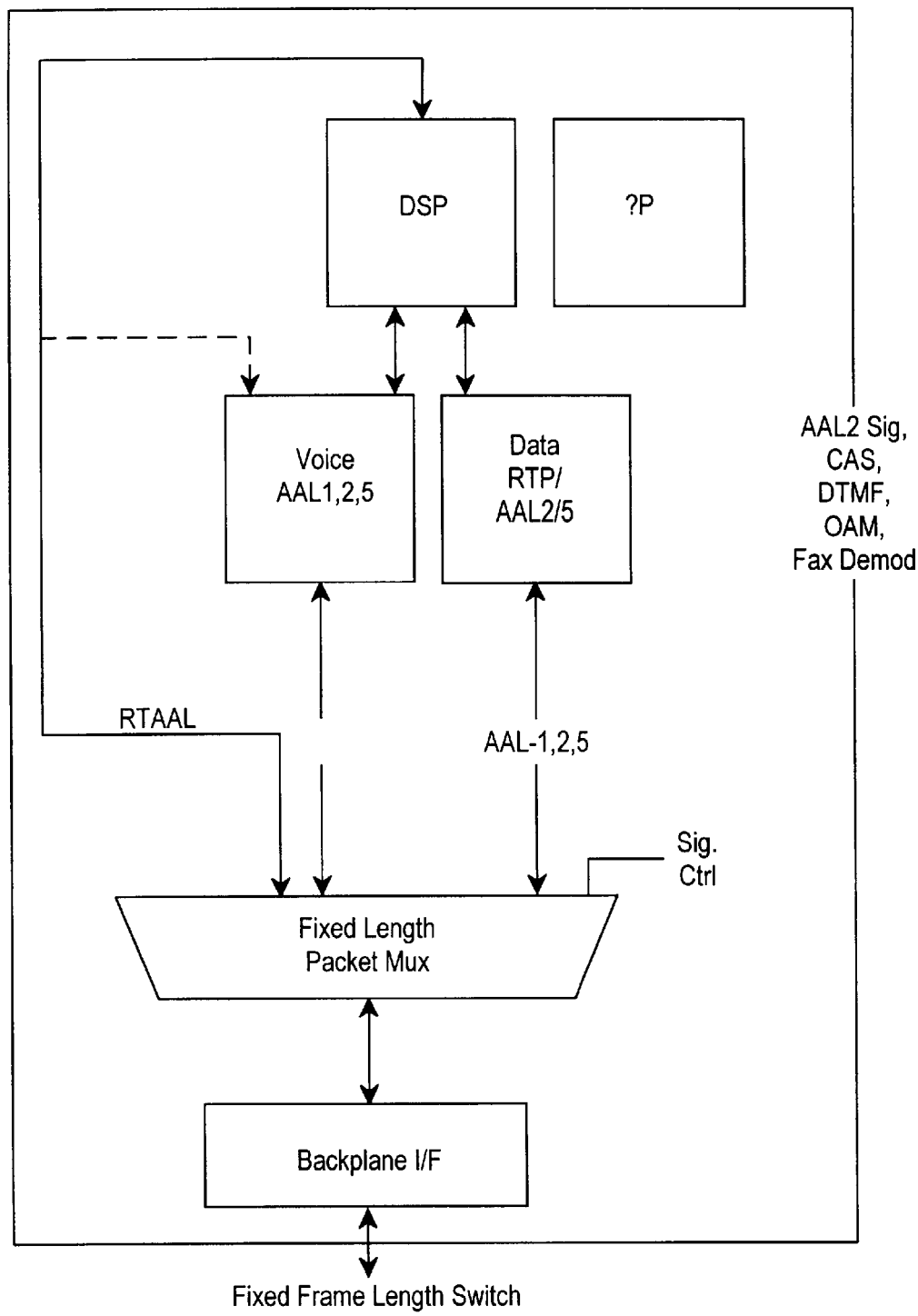
FIG. 11 shows how several of the devices of the generic adaptation technology suite may be used in the construction of a fixed packet length switch based resource module performing signal processing functions on TDM voice and adapting the processed traffic to or from AAL1, 2, 5.

FIG. 11 in analogy to FIG. 3, illustrates how the Voice, Data and an optional Fixed Length Packet Mux devices are used to construct TDM access adaptation and DSP resource module. The adaptation layer devices perform the conversion on a call-by-call basis to ATM AAL-1, 2 or 5.

Figure 12:
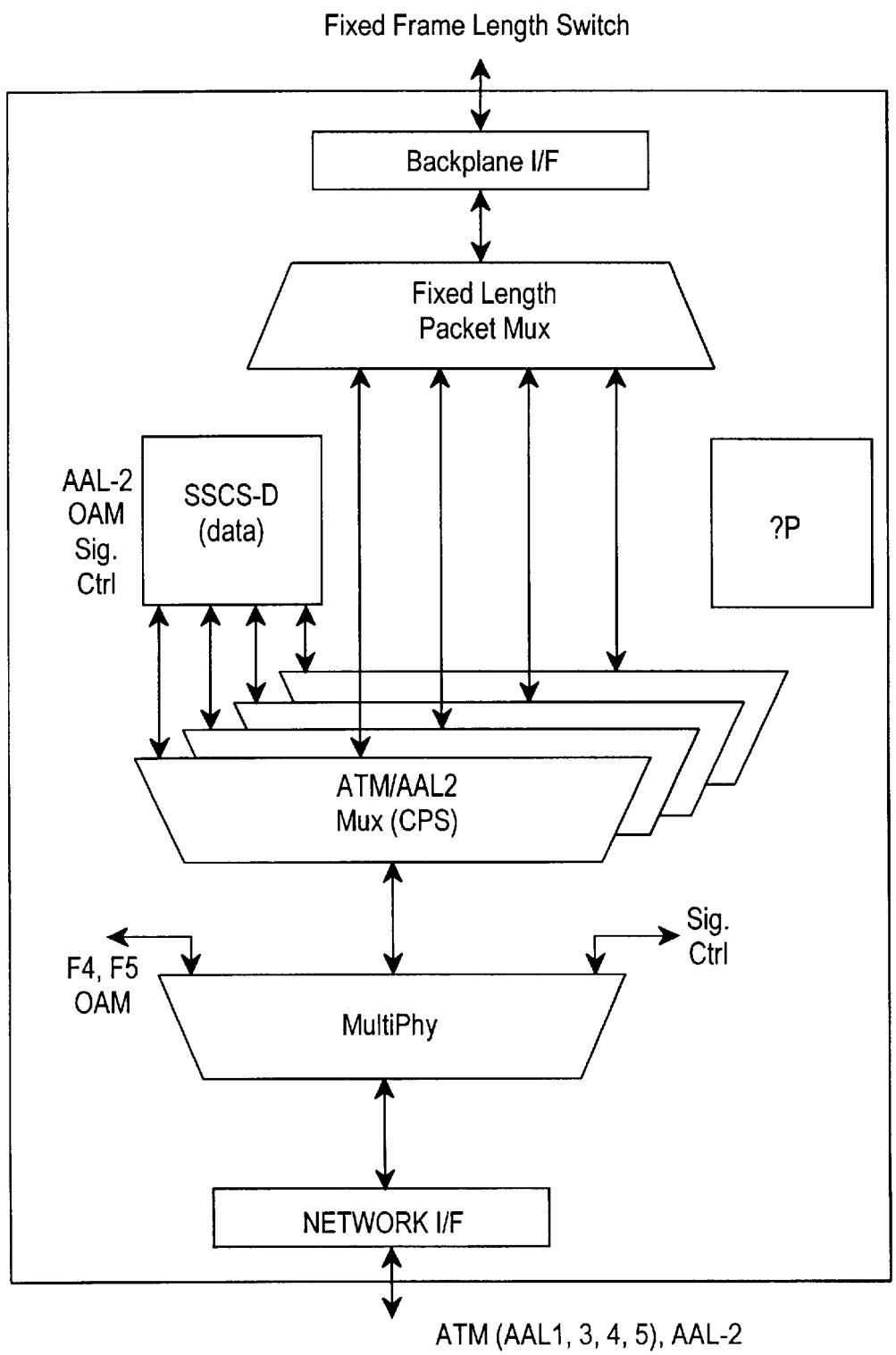
FIG. 12 shows how several of the devices of the generic adaptation technology suite may be used in the construction of a fixed packet length switch based resource module to interface to ATM networks and perform connection identification, multiplexing and segregation of ATM cells and AAL 2 mini-packets.

FIG. 12 in analogy to FIG. 4 depicts an ATM/AAL-2 port module using the ATM/AAL2 Mux device, to remove or add ATM headers and if necessary AAL-2 headers and routing translation to and from a generic connection identifier. The Data device may process AAL-2 connection control and OAM flows in such an application. In this arrangement the FLP switch functions as a native AAL 2 switch, and/or ATM switch.

Figure 13B:
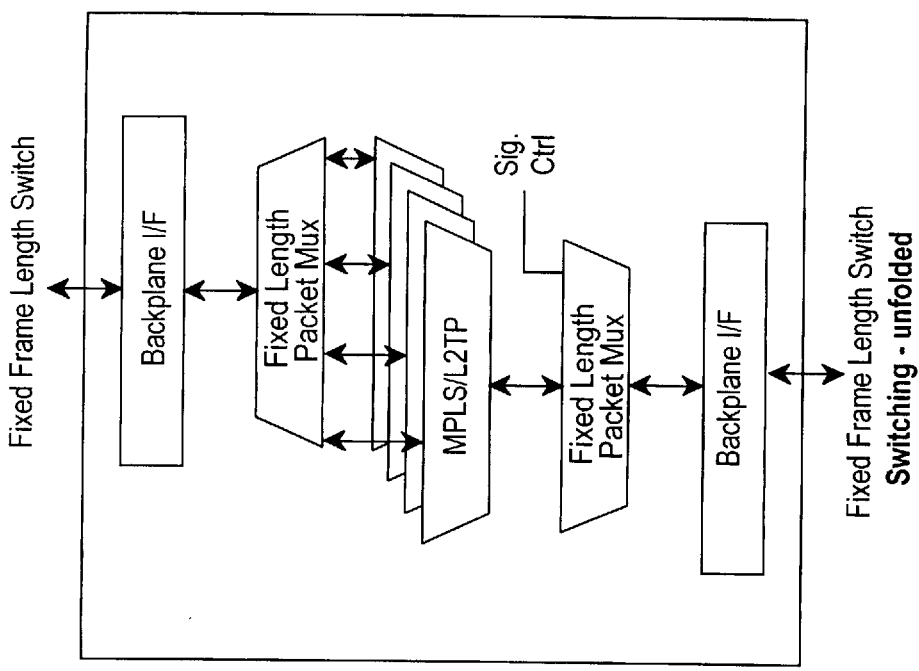
FIG. 13b shows how several of the devices of the generic adaptation technology suite may be used in the construction of a fixed packet length switch based resource module to perform connection identification, multiplexing and segregation of packets with MPLS labels and/or L2TP tunnels.
Figure 13A:
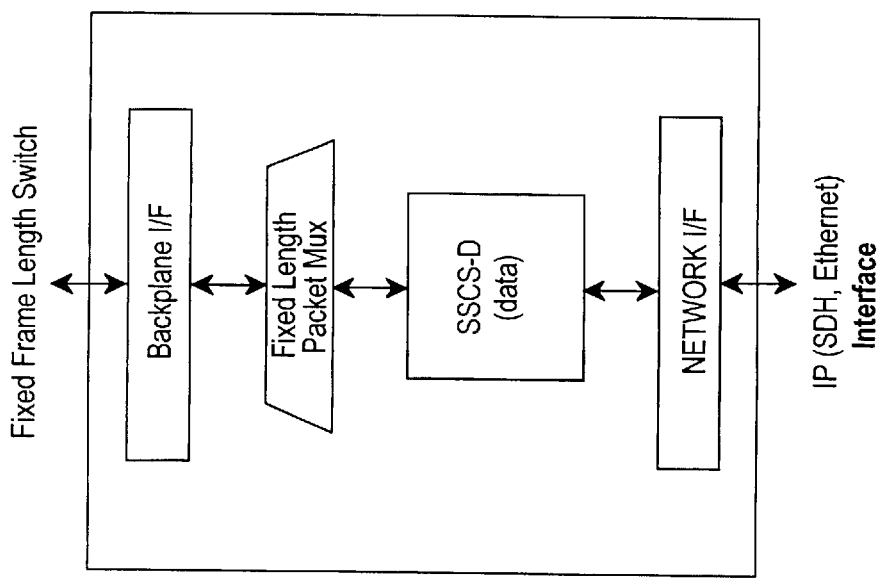
FIG. 13a shows how several of the devices of the generic adaptation technology suite may be used in the construction of a fixed packet length switch based resource module to interface to IP networks and perform route identification, multiplexing and segregation of IP packets.

FIG. 13a in analogy to FIG. 5, and FIG. 13b in analogy to FIG. 8, depict port and resource modules analogous to FIG. 12 for interfacing the FLP Switch to IP networks, and switching Layer 2 Tunnelling Protocol (L2TP) and multi-protocol label switching (MPLS).

Figure 14:
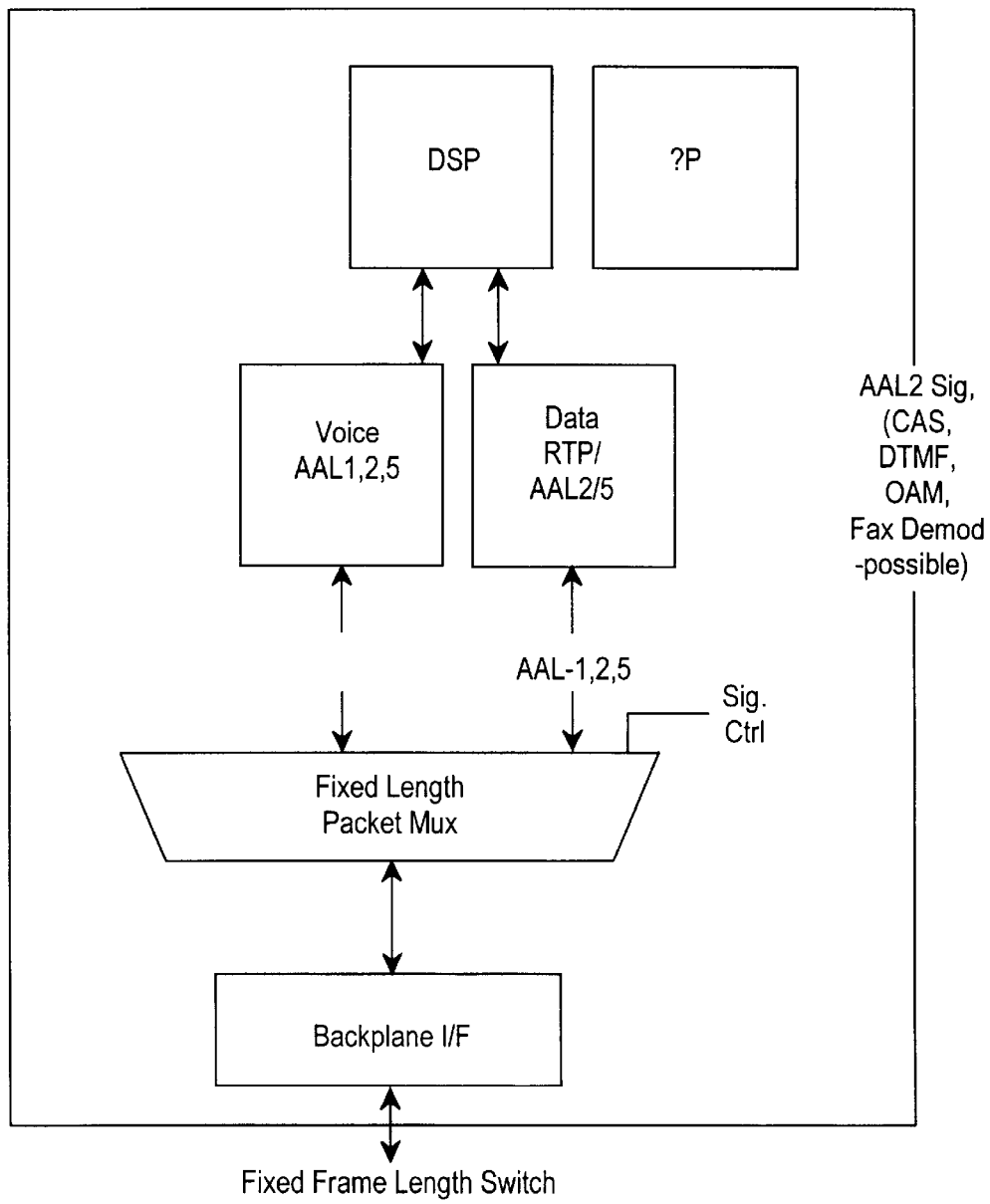
FIG. 14 shows how several of the devices of the generic adaptation technology suite may be used in the construction of a fixed packet length switch based resource module performing signal processing functions on RTP/AAL borne voice and adapting the processed traffic to or from RTP, AAL1, 2, 5.

FIG. 14 in analogy to FIGS. 6 and 7, depicts an ATM AAL/IP Interworking resource module using the Voice and Data devices, for interworking between voice services and compression algorithms in ATM adaptation layers AAL-1, 2 and 5, and RTP.

Figure 15:
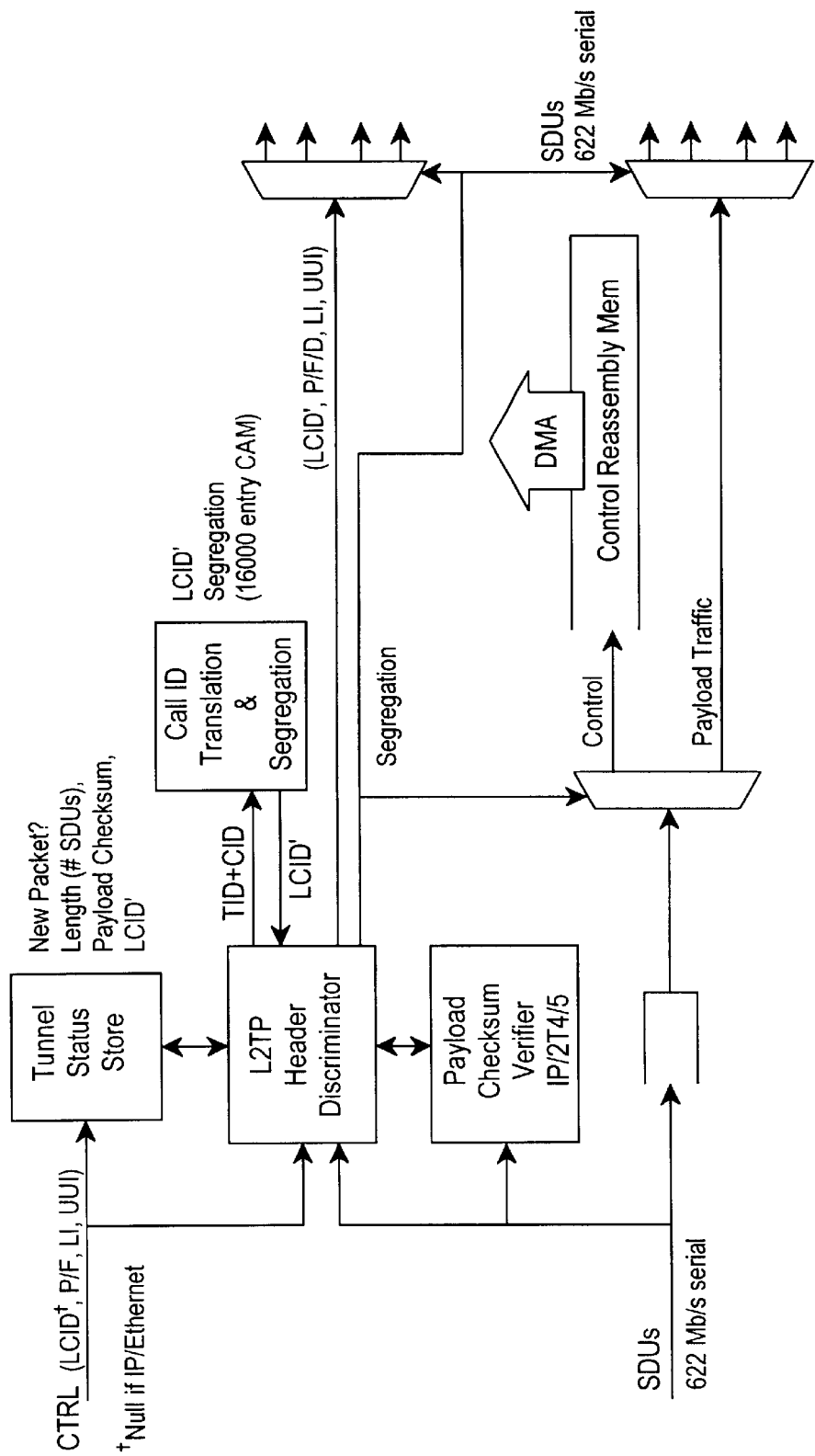
FIGS. 15 and 16 show the internal example architecture of the label device.
Figure 16:
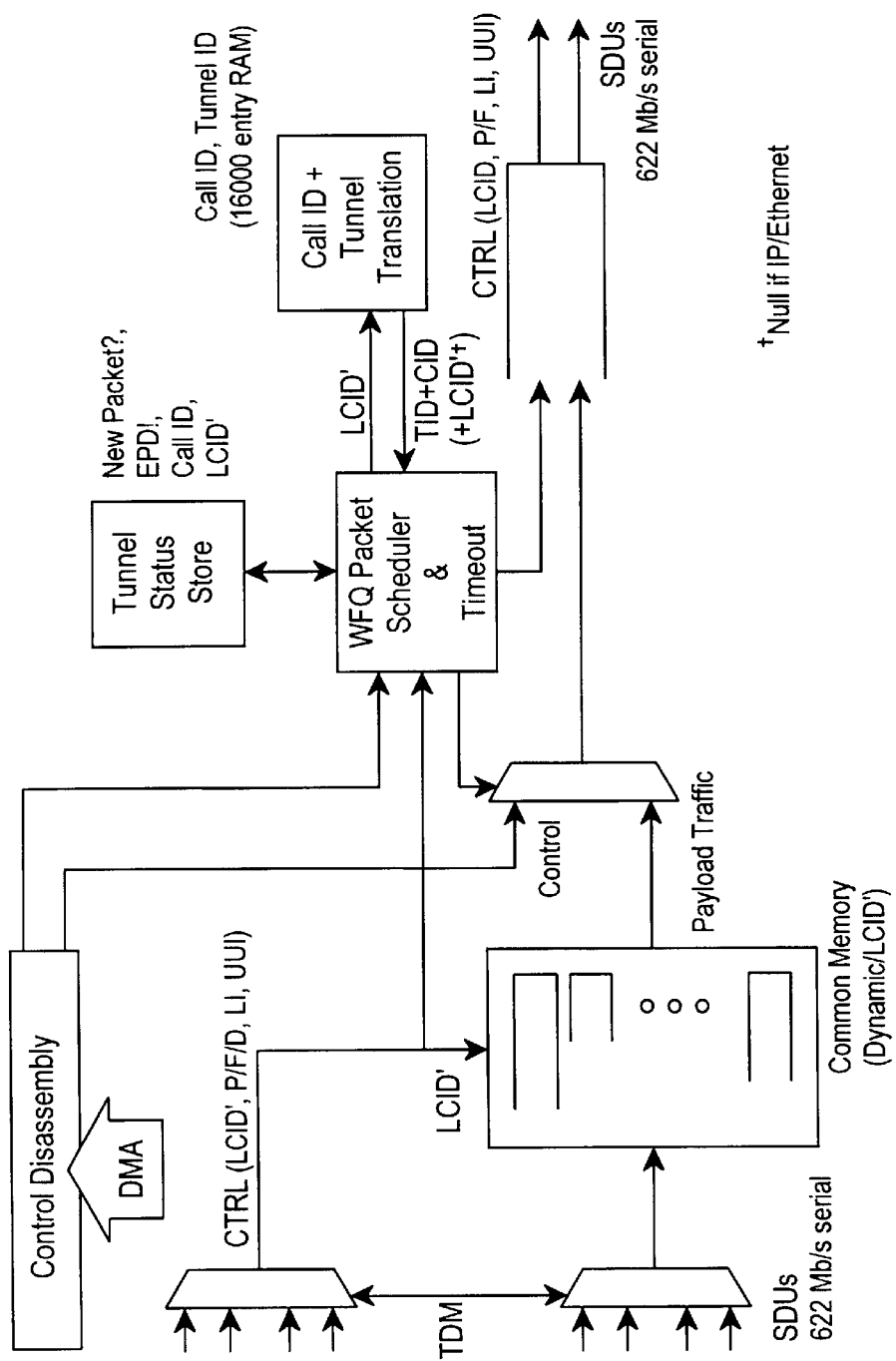

FIG. 15 and 16 show in schematic form the internal example architecture of the label device. On ingress with respect to the network, the generic interface may supply packet segments that emanate from the IP interface devices or the ATM/AAL-2 mux devices. The packets will have IP and UDP optionally removed, or will be padded and terminated with an AAL-5 trailer. If from the IP interface devices, the segments of the same packet will be received sequentially. If from the ATM/AAL-2 mux, segments of different packets may be received interleaved. The control information will contain a null or one-time connection identifier if IP sourced, and a translation of the VPI, VCI if ATM sourced, but this information is not always used but can extend the addressing range of the device. The partial/full indicator can signify if this is the last segment of the packet. The length indicator (LI) is always set to the length of the current segment in octets.

The L2TP/MPLS label discriminator can dip into the contents of the first segment of a packet to determine a sensible correlation of data as L2TP/MPLS fields. The first segment is a Boolean flag stored in the Tunnel Status Store, which also tallies the length of the packet for error control against fields contained in the packet data, a partial calculation of any checksum for header and payload of packet, and a local connection identifier (LCID') the translation of the tunnel identifier and call identifier, or label, performed for the first segment, and to be used by subsequent segments.

Since the IP network segments are sequential, they do not have to have an input LCID as they implicitly belong to the same packet as the first segment. A payload checksum verifier uses the stored value to check AAL-2, 5 and IP trailer checksums.

The L2TP/MPLS discriminator uses the LCID' to segregate the segments on an outgoing generic interface link, and determine control packets. Segments of control packets are concatenated in a buffer to be transferred to micro-controllers not shown.

On egress with respect to the network, packet segments are received on a link from the generic interface, and store in a queue of segments, a dynamic apportionment of a memory common to all local connections (LCIDs). Segment arrival is used to trigger a scheduler that empties the LCID queues on a Weighted Fair Queuing (WFQ) strategy or any other appropriate strategy. The scheduler uses a store to ensure that all the segments of one packet for a given LCID are ejected on a given output link sequentially when addressing an IP or ATM device. The scheduler may invoke a time-out if all the packet segments are nor available form that connection's queue in a given time, to avoid blocking the output link. The store may also operate the early packet discard algorithm of ATM, known to those skilled in the art, if a segment is lost on input or error is indicated by the ingress portion of the device. The device performs translation of the connection identifier to a tunnel and call identifier or label for output on the outgoing generic interface control link. Control packets may be multiplexed into the stream from a micro-controller, in a reciprocal fashion to the ingress function.

The optimal deployment of the Chip Suite requires a very flexible inter-chip communication interface, which can handle traffic with sufficient bandwidth irrespective of their AAL types and any variable packet lengths, between the CPS and the SSCS devices. The key functional problem of the inter-chip serial interface is to support any variable length packet based traffic, such as AAL-5, IP and other Frame Mode services, in the Chip Suite without incurring too much design overheads. This is addressed by transferring the internal traffic between the constituent devices with a generic Service Data Unit (SDU) format irrespective of their original traffic formats. Different generic SDUs transferring internally between the constituent devices are then segregated by each attaching with a generic Control-Word, which contains all the information necessary for the full service specific SDU/PDU to be re-assembled at the receiving device. This generic SDU transfer algorithm supported in the interface enables the functions to be optimally designed to handle any cell, packet or even framed-mode based services.

Figure 17:
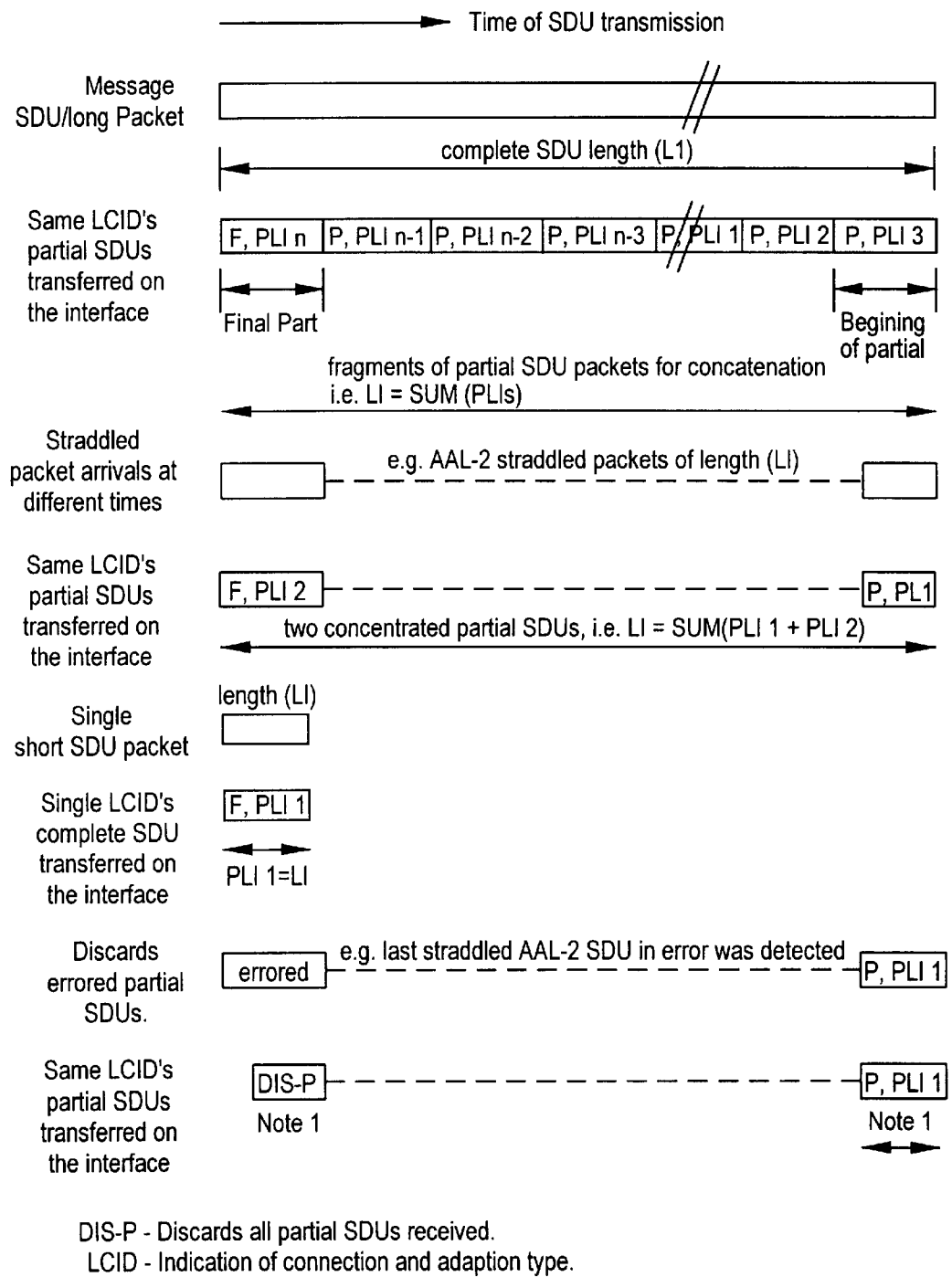
FIG. 17 illustrates variable length packet handling in the arrangement of FIG. 1.

FIG. 17 illustrates a generic process of how any variable length SDU packets are transferred and processed eventually at the receiving end. The Control-Word that gets sent with each variable length partial/complete SDU packets has the logical generic control-fields listed in Table 1 below:

TABLE 1

| Constituent Field | General usage Descriptions |
| --- | --- |
| LCID | Generic indication of a connection (and its adaptation type by mapping). |
| DIS (e.g. 00) | If asserted the Receiver will ignore both the Control-Word and its SDU. This is to enhance the serial interface fault detection. |
| DIS-P (e.g. | If asserted the Receiver will discard all the partial SDU |

TABLE 1-continued

| Constituent Field | General usage Descriptions |
|---|---|
| 11) | segments, defined by the LCID, previously received via the serial interface. |
| P | If asserted it indicates the current SDU segment being transferred is the beginning of a Partial, or more Partial. |
| F | If asserted it indicates the current SDU Segment being transferred across is the Final Part of a previous partial, or a single Complete Part. |
| PLI | To indicate the current partial/complete SDU Segment length being transferred. |
| AUUI | Indication of SDU packet type and other auxiliary information, depending on the connection. |
| Bit Error-Detection + future reserved. | Reserved for link bit-error detection and, depending on the serial link technology chosen, may offer also future-proofing bit fields. |

Generic Variable Length Packet Handling

FIG. 17 referred to above illustrates the manner in which, for very long message/packet handling, the original long packet of full length LI is segmented into its successive partial SDUs of the same LCID at the transmitting end of the serial interface before being transferred successively in the same order to the receiving end. The very first partial SDU being sent across the interface is indicated by a partial (P) and so are all the subsequent partial SDUs following it. The Receiver must runs a per LCID partial SDU re-assembly process to decide whether the very first partial SDU packet (i.e. PLI 1) is indeed a new partial or just one of the successive partials. This eliminates any ambiguous states which may occur due to using a single partial field (P) pattern for preserving bandwidth. The Receiver continues to re-assemble the received per LCID partial SDUs, for example in a per LCID buffer store, while also adding the logical PLI values up, until the final part of the partial SDU is indicated by the complete (F) pattern. This indicates the final SDU part is received and the total summation of all received PLIs, including the last one of PLI n, will be the full original length of the SDU packet transferred at the transmitting end. This generic partial SDU re-assembly process is independent of the original SDU full lengths and is therefore able to handle any variable length packets irrespective of their lengths and adaptation AAL types as illustrated in Cases B to C in FIG. 17. The lengths of each logical field in the generic Control-Word are design choices which will depend on the serial interface bandwidth and technology chosen by the implementor.

Generic Traffic Error and Link Failure Handling

If traffic errors are detected in the middle of a partial SDU recovery process at the sending end, e.g. Case D of AAL-2 VC PDU's STF errors; then the per LCID discard indication (DIS-P) is asserted to force the receiving end to discard all the partial SDUs previously held for that LCID to avoid partial SDU assembly errors. The bit patterns of discard partial (e.g. DIS-P: 11) or total discard (e.g. DIS: 00) can be chosen such that under a permanent stuck at "1" or "0" link failure condition is also detectable and all the constituent SDU packets transferring on that link can then be discarded immediately until the link failure condition is removed. Again this is a design choice for the implementer.

For a properly design point-to-point internal serial interface its link transmission error is normally not expected. The reserved link bit-error detection field can be as simple as just a parity bit or a CRC protection field, if multiple bit-error detection and correction are the concerns. In either way the transmission error handling should be similar to that of a link failure condition, except if error-correction is chosen, for simplicity but this is a matter of design choice and serial interface technology chosen by the users.

Generic Local Channel Identifier (LCID)

This logical field in the generic Control-Word is used to implicitly identify the connection type/channel and its adaptation AALs by software mapping (at the transmitting end) or re-mapping (at the receiving end) based on the network and service needs. The width of this field determines the total end to end connection capacity needs to be supported in a sub-system.

For example in a connection-orientated network, this LCID may be a one to one mapping with the connection ID of the network. But in a connectionless network, this may be a one-time value randomly or sequentially chosen for the segments of a packet, or related to IP destination or source address, or even empty if the IP header routing is retained in the SDU.

Generic Auxiliary User-to-User (AUUI)

Depending on the service and network to be supported, this logical field in the generic Control-Word can be used to identify the exact SDU Packet type being transferred (e.g. the full 32 coding points and Profile Identifications assigned for AAL-2 SDU/EDU for all AAL-2 VC connections) or other specific message/packet based information (e.g. AAL-5 message flags) etc.

Table 2 illustrates the generic control fields are encapsulated in a 32-bit wide logical Control-Word for the Chip Suite.

TABLE 2

| Constituent Field | Bits | Descriptions |
|---|---|---|
| LCID | 14 | Local Channel-ID addressable up to 16K Connection/Channel capacity. |
| DIS (e.g. 00) | 2: using 4 combs | If asserted the Receiver will ignore both the Control & Data received. This is to enhance the serial interface fault detection. |
| DIS-P (e.g. 11) | | If asserted the Receiver will discard all the partial SDU segments, defined by the LCID, that were previously received via the serial interface. |
| P (e.g. 01) | | If asserted it indicates the current SDU segment being transferred is the beginning of a Partial, or more Partial. |
| F (e.g. 10) | | If asserted it indicates the current SDU Segment being transferred across is the Final Part of a previous partial, or a single Complete Part. |
| PLI | 6 | To indicate the current partial/complete SDU Segment length being transferred is 1 to 64 octets. |
| AUUI | 5 | This is the "UUI" Field for AAL-2, and is re-defined as 3-bits for ATM's PTI field and 2 potential reserved bits for non AAL-2 services. |
| Bit Error-Detection + future reserved. | 5 | Reserved for link bit-error detection and, depending on the serial link technology chosen, may offer also future-proofing bit fields. |

Constituent Control-fields (32-bits) in the Control-Word
    Choice of 32-bit Control Word Length The flexibility and scalability of the Chip Suite may be enhanced by multiple accesses of SSCS devices to CPS devices, such as in the trunking/interworking case, or CPS to CPS devices as in the AAL-2 switching case. The 32-bit logical control-word length is chosen to provide an optimal balance of the Control-Word's overheads on the link and an effect of up to 4 multiple access windows (i.e. in 4 octet windows) are guaranteed to the Receiver on the serial interface. Such that instantaneous SDU arrivals from up to 4 serial interfaces (i.e. 4 cascaded devices) can always be guaranteed successful data transfer to a common buffer within the receiving device. This arrangement thus allows a simple and efficient common buffering architecture be organised in the receiving devices (i.e. CPS or SSCS) of the Chip Suite.

Inter-Chip Variable Length SDU Transfers and Scalability

Figure 18:
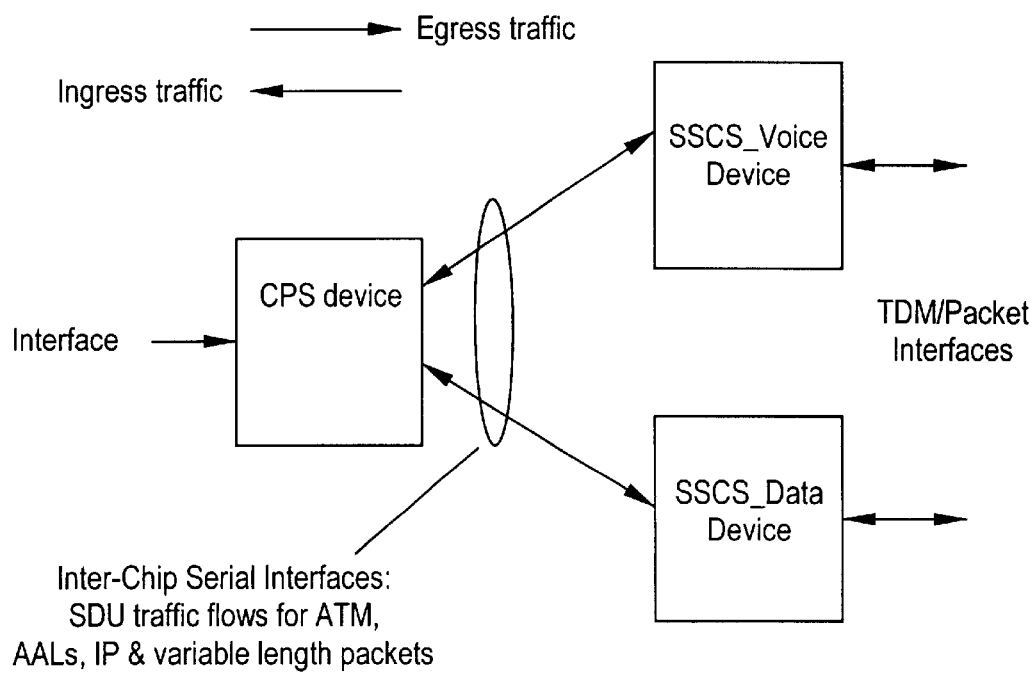
FIG. 18 illustrates the use of a serial interface.
Figure 19:
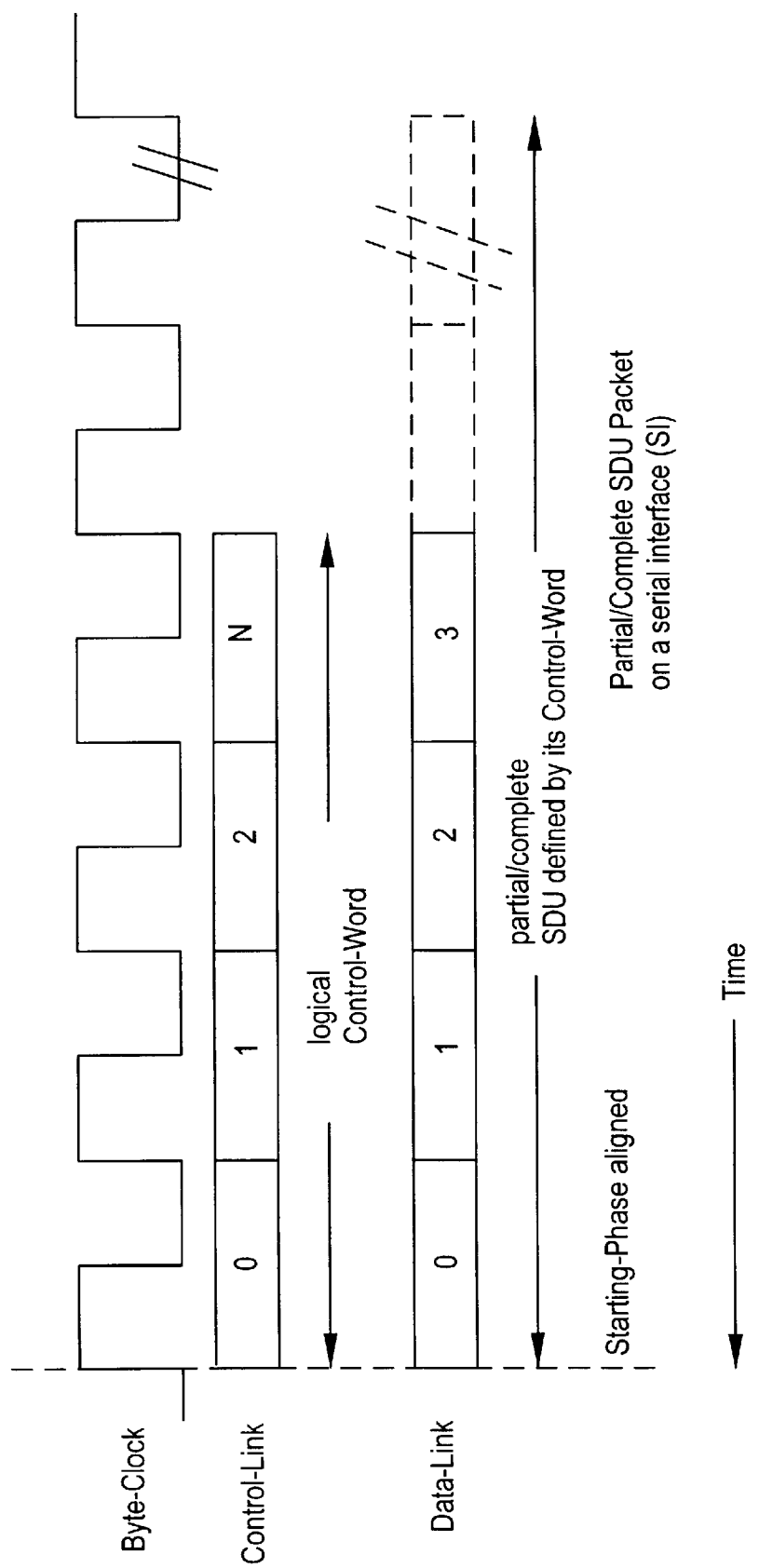
FIG. 19 is a timing diagram relating to the interface.

The serial interface (SI) shown in FIG. 18 is a unidirectional (one in each direction), high-speed, and packet based flexible serial interface. It is used for inter-device high-speed communications between the CPS (Common Part Sub-Layer) and the SSCS (Service Specific Convergence Sub-Layer) constituent devices of the Chip Suite for carrying both the Control and SDU packet information with minimum delays. Its point-to-point physical communication nature provides an optimal balance between reliability, usability, simplicity and scalability needed for the chip suite partitioning.

Within the design capacity (connection and bandwidth) of the devices, it supports the simplest scalability of multiple CPS or SSCS, or both, constituent devices by providing appropriate serial interfaces to each device to form a fully scalable sub-system from the basic Chip Suite line-up.

Speed and Bandwidth Scalability for the Chip Suite

Figure 20:
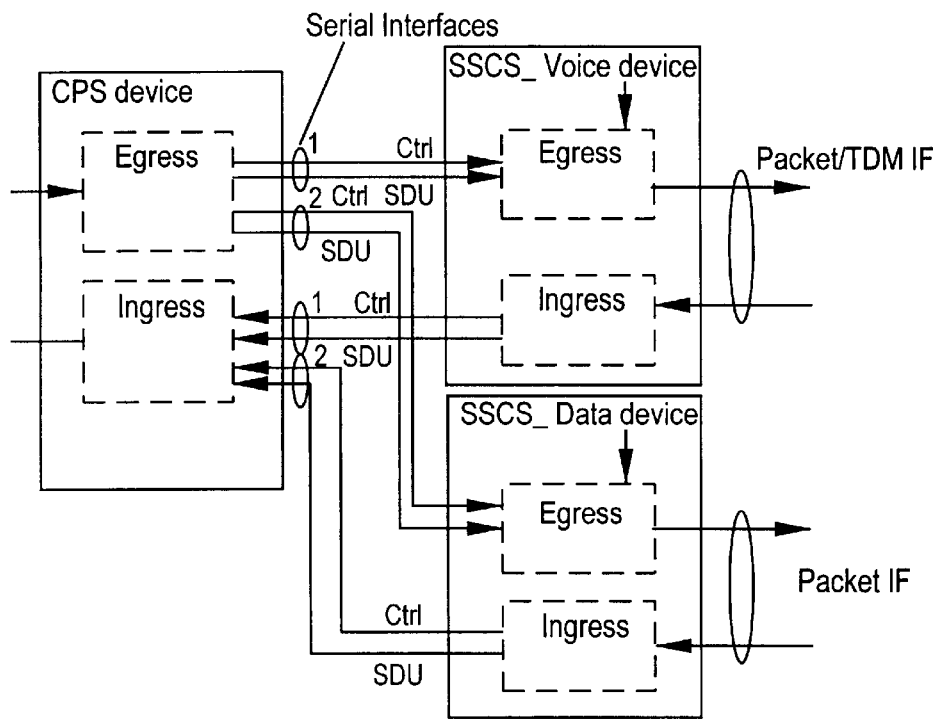
FIG. 20 illustrates an adaptation resource module for trunking/interworking.

Separate serial links are used for each direction of communication (egress and ingress) in each device. The serial links are always work in a pair to form a logical high-speed serial interface (egress/ingress direction) for transmission bandwidth dilation and hence scalability. The generic control-word information, which defines uniquely the SDU packet being transferred across on one link (Data-Link), is transmitted on the other link (Control-Link) within the same pair. The data being transmitted on each link in any pairs are always synchronised and in phase with its control link to simplify data recovery. Reference should be made to FIG. 20 for the example serial interface logical timings. This timing arrangement optimally allows a single control-word can be sent to fully define its associated traffic SDU for maximum link bandwidth efficiency, regardless of the SDU length.

Figure 21:
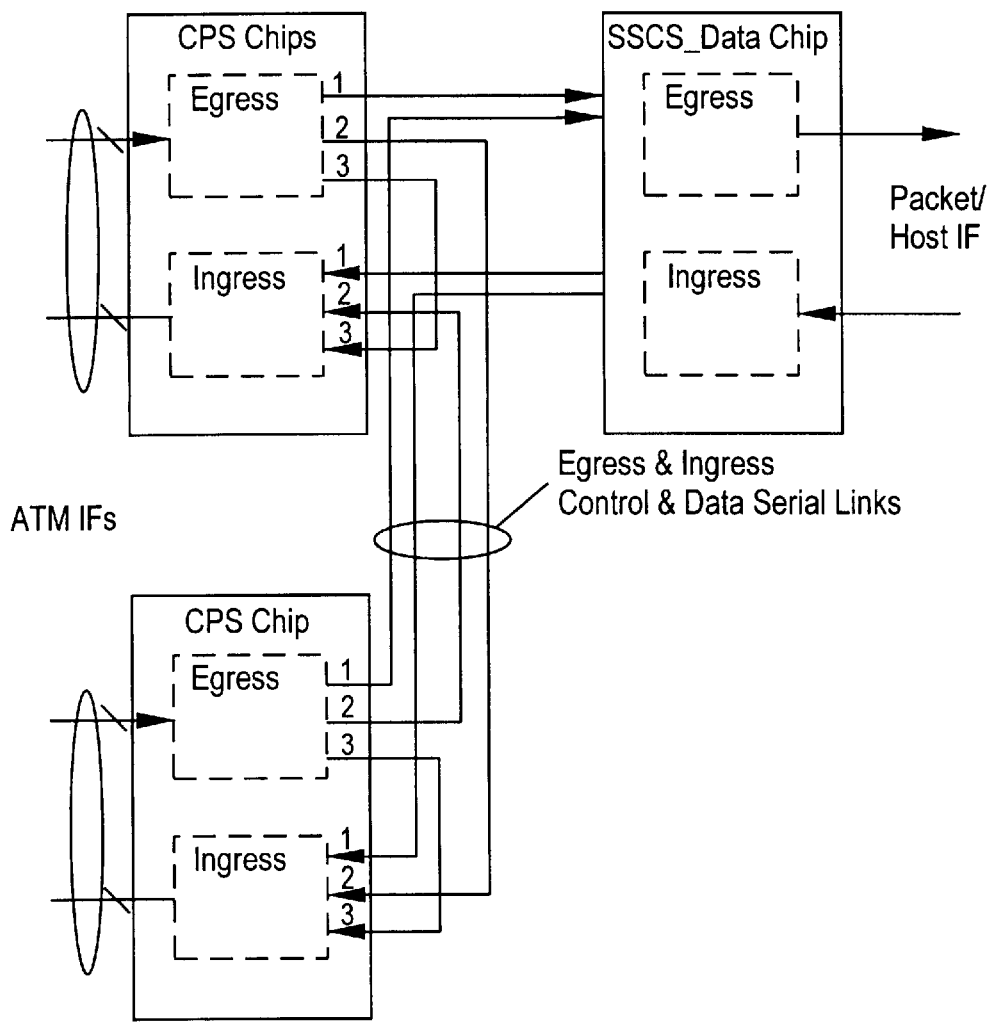
FIG. 21 illustrates an AAL2 switching resource module.

A method of achieving full Trunking/Interworking and AAL-2 Switching Application Flexibility is illustrated in FIGS. 20 and 21 which show respectively the use of serial interfaces in an adaptation resource module for trunking/inter-working, and in an AAL-2 switching resource module. These figures illustrate by way of example in general schematic form how these serial interfaces can be used to provide the full capability of the Chip Suite.

It will be understood that the above description of a preferred embodiment is given by way of example only and that various modifications may be made by those skilled in the art without departing from the spirit and scope of the invention.

What is claimed is:

1. An ATM adaptation interface for processing a plurality of traffic types, said interface comprising a first group of devices that perform multiplexing, segregation and routing field translation for each said respective traffic type, and a second group of devices that perform format conversions between service payloads of said traffic types and an adaptation layer control format.

2. An ATM adaptation interface for processing a plurality of traffic types, said interface comprising a first group of devices that perform multiplexing, segregation and routing field translation for the respective traffic type, a second group of devices that perform format conversions between service payloads comprising voice and data and an adaptation layer control format, and an interface disposed between said first and second devices of the two groups for the transference of arbitrary and variable length packets between said devices.

3. An interface arrangement for interfacing a TDM network and an ATM network, said interface arrangement consisting of first and second groups of bi-directional devices having an interface therebetween, wherein said first group devices are arranged to perform multiplexing, segregation and routing field translation, and wherein said second group devices are arranged to perform format conversions between a service payload (voice, video or data) and an adaptation layer control format.

4. An interface arrangement as claimed in claim 3, wherein said first and second device groups are coupled via an ATM switch.

5. An interface arrangement as claimed in claim 4, wherein said ATM switch comprises a fixed length packet switch.

6. An interface arrangement as claimed in claim 5, wherein said fixed length packet switch is input buffered.

7. An interface arrangement as claimed in claim 6, wherein said first and second group devices are output buffered.

8. An interface arrangement as claimed in claim 3, wherein a generic interface is provided between said first and second device groups for the transference therebetween of arbitrary and variable length packets.

9. An interface arrangement as claimed in claim 8, wherein said first device group incorporates a label device arrangement, said label device arrangement being cascaded to perform label or tunnel and call switching.

10. An interface arrangement as claimed in claim 9, wherein said label device arrangement is connected in several layers to add or remove, and perform switching at several nested layers of labels or tunnels.

* * * * *